(12) United States Patent
Yashima et al.

(10) Patent No.: US 8,259,557 B2
(45) Date of Patent: Sep. 4, 2012

(54) RECORDING AND REPRODUCTION CONTROL OF OPTICAL DISC, OPTICAL DISC DRIVING APPARATUS, OPTICAL DISC DRIVING METHOD, DATA PROCESSING APPARATUS, AND OPTICAL DISC RECORDING/REPRODUCING APPARATUS USING VERSION OF SPECIFICATION INFORMATION INCLUDED IN THE OPTICAL DISC

(75) Inventors: Noboru Yashima, Tokyo (JP); Naoki Kizu, Tokyo (JP); Mitsuru Ishizuka, Tokyo (JP); Satoshi Michihata, Tokyo (JP); Yoshihiro Kiyose, Tokyo (JP); Osamu Tsukahara, Tokyo (JP); Masaharu Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 986 days.

(21) Appl. No.: 11/547,471

(22) PCT Filed: Jan. 7, 2005

(86) PCT No.: PCT/JP2005/000105
§ 371 (c)(1),
(2), (4) Date: Oct. 5, 2006

(87) PCT Pub. No.: WO2005/101380
PCT Pub. Date: Oct. 27, 2005

(65) Prior Publication Data
US 2008/0279085 A1 Nov. 13, 2008

(30) Foreign Application Priority Data

Apr. 8, 2004 (JP) .................. 2004-114723
May 28, 2004 (JP) .................. 2004-160278

(51) Int. Cl.
*G11B 7/24* (2006.01)
(52) U.S. Cl. ..................... 369/275.3
(58) Field of Classification Search ................ None
See application file for complete search history.

(56) References Cited

U.S. PATENT DOCUMENTS

| | | | |
|---|---|---|---|
| 5,155,719 A | 10/1992 | Masakawa et al. | |
| 5,959,950 A * | 9/1999 | Yamashita et al. | 369/30.83 |
| 6,320,840 B1 * | 11/2001 | Oh et al. | 369/286 |

(Continued)

FOREIGN PATENT DOCUMENTS

EP 0 739 008 B1 3/2002

(Continued)

*Primary Examiner* — Hoa T Nguyen
*Assistant Examiner* — Mark Fischer
(74) *Attorney, Agent, or Firm* — Birch, Stewart, Kolasch & Birch, LLP

(57) ABSTRACT

By avoiding the problem that in a hybrid optical disc, an optical pickup suitable for a standard-density recording area cannot operate as desired in a high-density recording area, damage to the disc drive or optical disc is prevented and optimal control is enabled. Access operation identification information such as reproducing identification information indicating whether or not information recorded in the user data area of the optical disc can be reproduced under the reproducing conditions of the optical disc driving apparatus is recorded in the lead-in area. The optical disc driving apparatus reads this type of access operation identification information, compares it with access operation identification information possessed by the optical disc driving apparatus, and if they do not correspond, does not carry out access operations by the optical head to the user data area, because reproducing or recording compatibility with the optical disc is lacking.

2 Claims, 21 Drawing Sheets

U.S. PATENT DOCUMENTS

| | | | |
|---|---|---|---|
| 6,434,087 B1* | 8/2002 | Schell et al. | 369/13.02 |
| 6,826,139 B1* | 11/2004 | Oh et al. | 369/53.37 |
| 6,931,654 B1* | 8/2005 | Oh et al. | 720/718 |
| 6,958,965 B2* | 10/2005 | Ueda et al. | 369/53.21 |
| 7,009,926 B2* | 3/2006 | Lee | 369/59.11 |
| 7,038,982 B2* | 5/2006 | Schreurs et al. | 369/47.53 |
| 7,046,605 B1* | 5/2006 | Ko | 369/53.2 |
| 7,068,579 B2* | 6/2006 | Tasaka et al. | 369/59.24 |
| 7,301,873 B2* | 11/2007 | Taniguchi et al. | 369/53.2 |
| 7,391,694 B2* | 6/2008 | Erickson et al. | 369/53.37 |
| 2003/0174612 A1* | 9/2003 | Fukushima et al. | 369/47.52 |
| 2004/0223446 A1* | 11/2004 | Lee | 369/275.3 |
| 2006/0023622 A1* | 2/2006 | Suh | 369/275.3 |

FOREIGN PATENT DOCUMENTS

| | | |
|---|---|---|
| JP | 2-308425 A | 12/1990 |
| JP | 7-169187 A | 7/1995 |
| JP | 7-226012 A | 8/1995 |
| JP | 8-287603 A | 11/1996 |
| JP | 11-96602 A | 4/1999 |
| JP | 2001-143268 A | 5/2001 |
| JP | 2001-312860 A | 11/2001 |
| JP | 2001-312861 A | 11/2001 |
| JP | 2002-8323 A | 1/2002 |
| JP | 2004-005772 A | 1/2004 |
| TW | 490659 | 6/2002 |

* cited by examiner

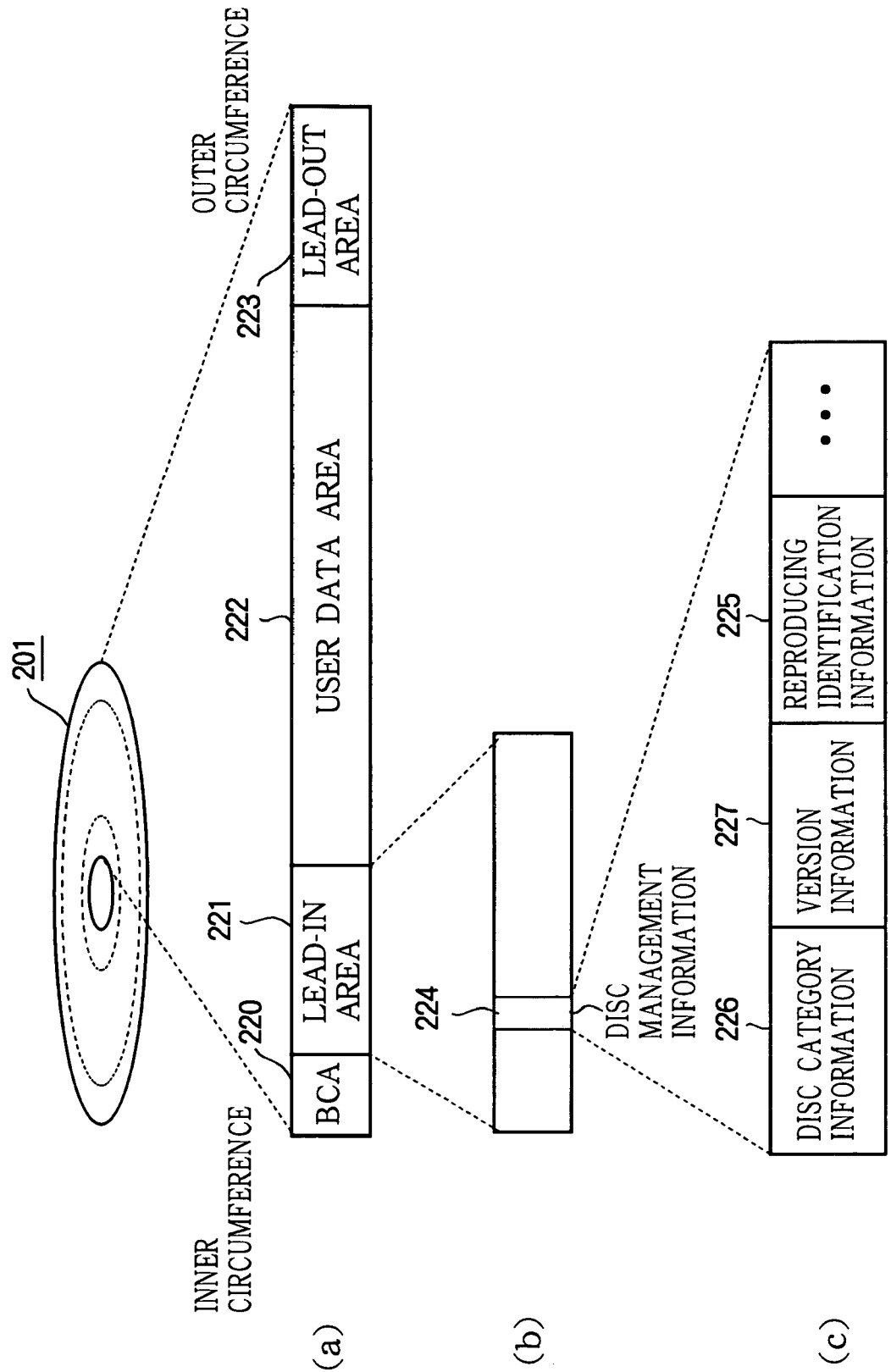

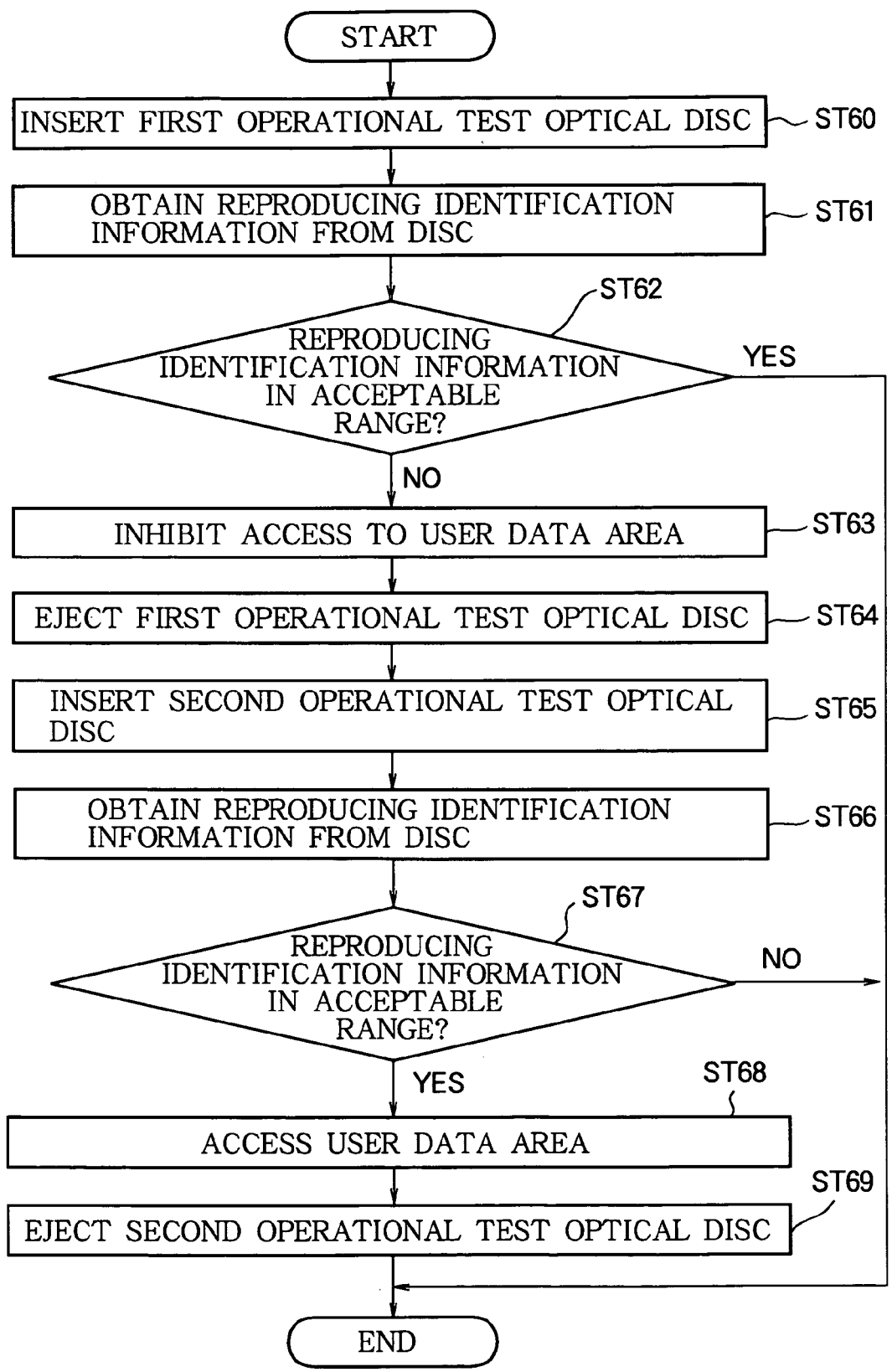

RECORDING AND REPRODUCTION CONTROL OF OPTICAL DISC, OPTICAL DISC DRIVING APPARATUS, OPTICAL DISC DRIVING METHOD, DATA PROCESSING APPARATUS, AND OPTICAL DISC RECORDING/REPRODUCING APPARATUS USING VERSION OF SPECIFICATION INFORMATION INCLUDED IN THE OPTICAL DISC

FIELD OF THE INVENTION

The present invention relates to an optical disc such as any of the various types of DVD discs, including DVD-ROM (Digital Versatile Disc Read Only Memory), DVD-R (Recordable), and DVD-RW (Rewritable); the invention also relates to optical disc driving apparatus and an optical disc driving method that operate according to information recorded in these optical discs, to data processing apparatus connected to the optical disc driving apparatus, to optical disc recording apparatus or reproducing apparatus equipped with the optical disc driving apparatus (apparatus that can perform at least one of the two operations of recording on and reproducing from an optical disc will also be referred to as 'optical disc recording/reproducing apparatus'), to optical discs for operational testing, and to an operational test method.

BACKGROUND ART

As technology for enabling the physical properties of discs and unit areas to be distinguished easily and accurately while maintaining compatibility with discs having existing formats, there is technology that records information about such physical properties as the material from which the recording medium is made, the type of disc, its linear velocity, its track pitch, its inertial moment, and its shape and size in a subcode provided in the disc format, and has the recording apparatus or reproducing apparatus read the subcode (For example, Japanese Patent Application Publication No. 2001-312860).

DISCLOSURE OF THE INVENTION

For recording on or reproducing from optical discs with different physical properties, or an optical disc in which different areas have different physical properties, recording or reproducing control suited for both types of optical discs or for each area is essential.

Although information about the physical properties is recorded in the subcode in the prior art noted above, when the difference in physical properties includes a difference in recording density, the information about the physical properties may itself be unreadable, in which case recording or reproducing control suitable for the optical disc cannot be carried out.

This problem is particularly pronounced in the hybrid optical discs proposed as next-generation discs, in which a single disc includes both a standard-density recording area and a high-density recording area.

In this type of hybrid optical disc, an optical pickup designed for the standard-density recording area is unable to operate as desired in the high-density recording area and may cause a malfunction. For example, since the linear recording density differs in the high-density recording area, it may not be possible to detect the linear velocity, disabling control of the disc rotation so that the spindle motor runs out of control, or the track-following operation may be disabled because the track density differs, so that in the worst case the tracking actuator is burned out by an overcurrent flow.

Aside from cases in which the differing physical property involves the recording density, problems may also occur if the allowable reproducing power differs. For example, in an optical disc of the write-once type or the rewritable type, in which the maximum value of the reproducing power is predetermined, repeated reproducing operations at a reproducing power in excess of the rated value may erase recorded information.

An object of the present invention is therefore to provide an optical disc, an optical disc driving apparatus and an optical disc driving method, a data processing apparatus connected to an optical disc driving apparatus, an optical disc recording apparatus/reproducing apparatus equipped with the optical disc driving apparatus, an optical disc for operational resting, and an operational test method that can prevent optical disc driving apparatus from causing damage to the optical disc or to the optical disc driving apparatus itself.

The present invention is an optical disc used in an optical disc driving apparatus in which information is accessed by an optical head and the accessed information is read, wherein access operation identification information indicating whether or not the optical disc driving apparatus can access a particular area of the optical disc is held in a second area other than the particular area.

According to the present invention, optical control that prevents an optical disc driving apparatus from causing damage to an optical disc or to the optical disc driving apparatus itself is possible.

BRIEF DESCRIPTION OF THE DRAWINGS

FIG. 14 is a drawing showing the recording area format of an optical disc in a twelfth embodiment.

FIG. 21 is a flowchart illustrating operations in an operational test method for an optical disc driving apparatus using an optical disc in a sixteenth embodiment.

BEST MODE OF PRACTICING THE INVENTION

Embodiments of the invention will now be described with reference to the attached drawings.

First Embodiment

Figure 1:
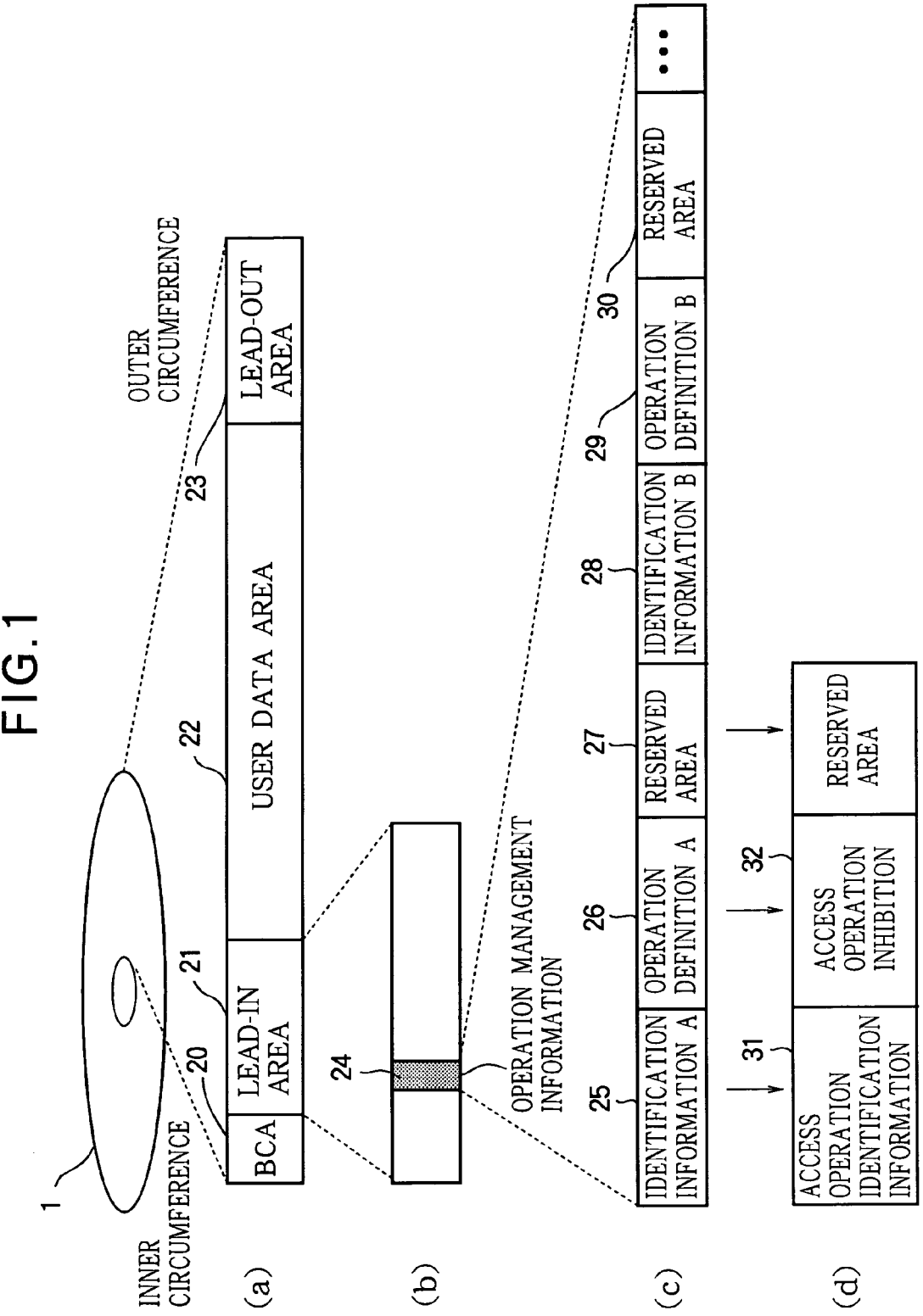
FIG. 1 is a drawing showing the recording area format of an optical disc in a first embodiment.

FIG. 1 is a drawing showing the recording area format of an optical disc in a first embodiment. As shown in FIG. 1 (a), from its inner edge to its outer edge, the optical disc 1 comprises a BCA (Burst Cutting Area) 20 in which information is recorded when the fabrication of the optical disc 1 has been completed, a lead-in area 21 in which information about the physical properties of the optical disc 1 is recorded, a user data area 22 in which content data are recorded, and a lead-out area 23 in which the same information is recorded as in the lead-in area 21. Reproduction by the optical disc driving apparatus proceeds sequentially-outward from the inner circumference of the optical disc 1.

As shown in FIG. 1 (b), operation management information 24 for management and control of the operation of the optical disc driving apparatus that reproduces signals from the optical disc 1 is recorded in the lead-in area 21.

FIG. 1 (c) shows the recording format of the operation management information 24. The operation management information 24 in FIG. 1 (c) comprises identification information 25, 28, . . . defining operations that the optical disc driving apparatus performs when playing the optical disc 1, operation definitions 26, 29, . . . defining operations that the optical disc driving apparatus performs when the identification information 25, 28, . . . is unintelligible, and reserved areas 27, 30, . . . reserved for recording information that may be required in the future. The optical disc 1 may define a plurality of identification information 25, 28, . . . for the operations that the optical disc driving apparatus performs.

As shown at FIG. 1 (d), the operational management information given in identification information A 25 and operation definition A 26 is access operational management information for managing access operations (seek operations) by the optical head of the optical disc driving apparatus to the user data area 22. The access operation identification information 31, which is an identification code for access operations by the optical head of the optical disc driving apparatus, is recorded in identification information A 25, and an access operation inhibition bit 32 is allocated in operation definition A 26 to indicate whether access operations to the user data area 22 are prohibited or not when the access operation identification information 31 of the loaded optical disc 1 is unintelligible to the optical disc driving apparatus. Therefore, when the access operation identification information 31 of the loaded optical disc 1 is unintelligible to the optical disc driving apparatus, if it recognizes that the access operation inhibition bit 32 is set to '1', it halts access operations to the user data area 22 and does not have the optical head perform read operations. Even if the access operation identification information 31 of the loaded optical disc 1 is unintelligible, however, if the access operation inhibition bit 32 is cleared to '0', the optical disc driving apparatus continues normal operations. If the access operation identification information 31 is intelligible, normal operations continue without the reading of the access operation inhibition bit 32.

The operation management information 24 is recorded in the lead-in area 21 in this embodiment, but it may also be recorded in the BCA 20 or lead-out area 23.

When the optical disc driving apparatus recognizes that the access operation inhibition bit 32 is set to '1', in the description above, access operations to the user data area 22 were halted, but access operations may be halted immediately without even reading the rest of the lead-in area 21.

An example in which the optical disc 1 was a reproduce-only optical disc such as a DVD-ROM disc was shown above; in this case, the operation management information 24 is preferably pre-recorded by the optical disc manufacturer.

In this embodiment, even if the optical disc 1 includes information that the optical disc driving apparatus cannot read, because the optical disc 1 is a new disc version or for some other such reason, the operation management information 24 in the lead-in area 21 can be read, so access operations by the optical head to the user data area 22 can be inhibited to protect the contents of the optical disc and avoid optical disc damage and other worst-case scenarios.

Second Embodiment

Figure 2:
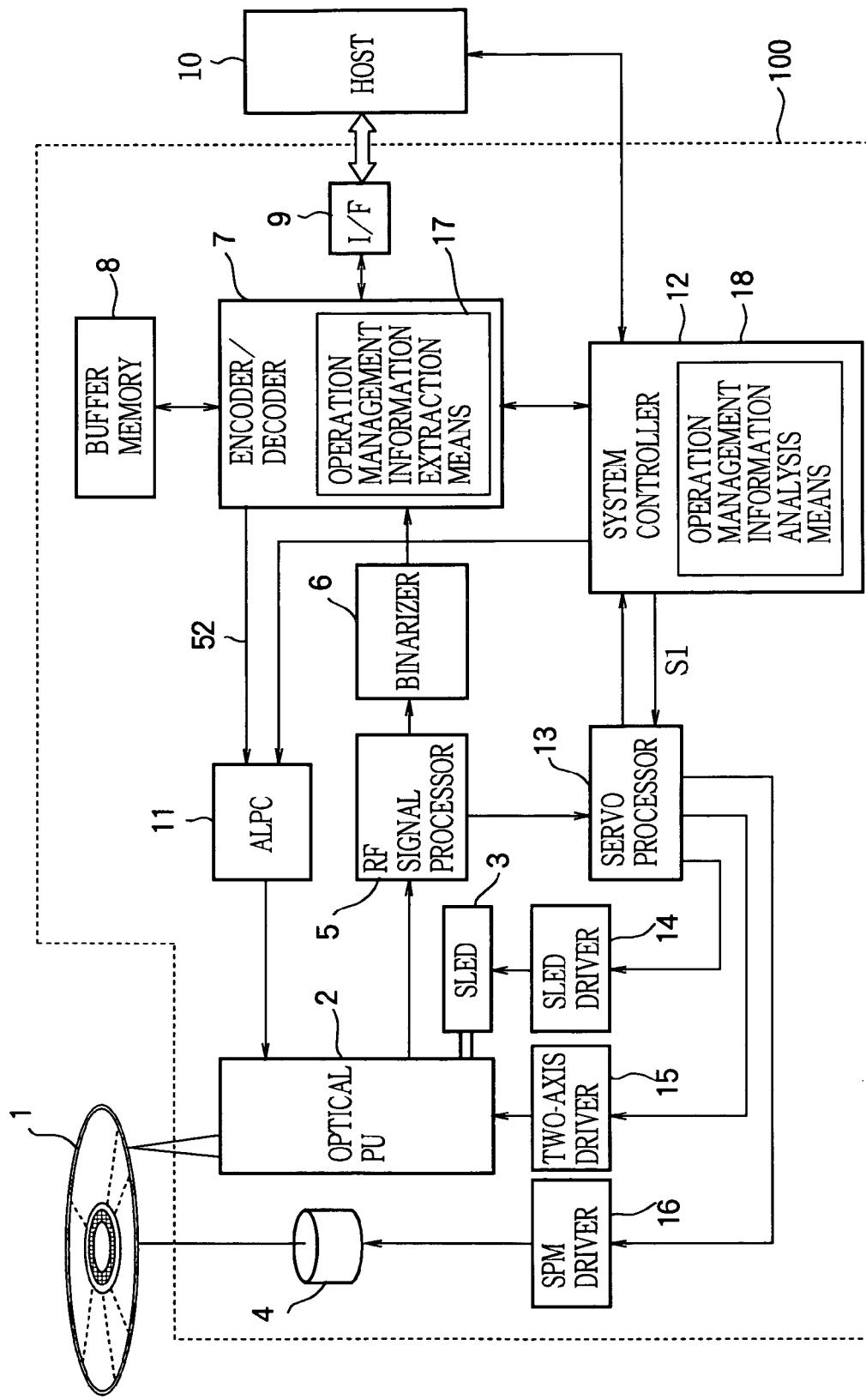
FIG. 2 is a block diagram of an optical disc driving apparatus in a second embodiment.

FIG. 2 is a block diagram of an optical disc driving apparatus 100 for the optical disc in the first embodiment.

As shown in FIG. 2, the optical disc 1 is read by an optical pick-up (PU) 2, followed by amplification in an RF signal processor 5. The RF signal processor 5 outputs a reproduced-RF signal to a binarizer 6, and generates a tracking error signal, a focus error signal, and other signals which are supplied to a servo processor 13 for servo control.

The servo processor 13 generates a focus drive signal and a tracking drive signal responsive to the focus error signal and tracking error signal, and supplies them to a two-axis driver 15. The two-axis driver 15 performs focus and tracking control by driving a focus coil and a tracking coil in the optical pickup 2.

Seek access to a desired address is carried out as follows. The servo processor 13 generates a sled control signal according to a sled error signal obtained as a low-frequency component of the tracking error signal supplied from the RF signal processor 5, and to access execution control from the system controller 12, and supplies the sled control signal to a sled driver 14. The sled driver 14 slides the optical pickup 2 by driving a sled 3 responsive to the sled control signal.

During reproducing, the optical disc 1 is controlled to rotate at a constant velocity or a constant angular velocity by driving a spindle motor 4 according to a control signal from a spindle motor (SPM) driver 16. The reproducing laser power in the optical pickup 2 is controlled by an automatic laser power controller (ALPC) 11 responsive to a laser control signal from the system controller 12.

The optical head comprises the optical pickup 2, the sled 3, and the spindle motor 4.

Next, the operation in reproducing information recorded on the optical disc 1 will be described.

The RF signal obtained by the RF signal processor 5 is digitized by the binarizer 6 and supplied to the encoder/decoder 7 as a modulated signal. The encoder/decoder 7 functions partly as a decoder for reproducing and partly as an encoder for recording. During reproducing it decodes the modulated signal by a process that includes demodulation, error correction via a buffer memory 8, de-interleaving, and other signal processing. The decoded signal is output to a host 10 through an interface (I/F) 9 such as an ATAPI interface. The system controller 12 exchanges commands and other information with the servo processor 13, the encoder/decoder 7, and the host 10.

The initial operation of the optical disc driving apparatus 100 will be described below.

First, when a optical disc 1 is inserted into the optical disc driving apparatus 100 and its power is switched on, it accesses the optical disc 1, starting from the inner edge and proceeding up to a predetermined address in the lead-in area 21. The encoder/decoder 7 begins buffering data in the buffer memory 8, correcting errors in the reproduced information, and de-interleaving the information.

After error correction, from the information that has been correctly reproduced from the lead-in area 21, an operation management information extraction means 17 in the encoder/decoder 7 extracts the operation management information 24 and outputs it to the system controller 12. The operation management information 24 is analyzed by an operation management information analysis means 18 in the system controller 12. More specifically, first the system controller 12 detects the identification information 25, 28, . . . in the operation management information 24; if it can tell what type of operations the identification information 25, 28, . . . specifies, normal operation proceeds; if the identification information 25, 28, . . . is unintelligible, the operation is controlled according to the operation definitions 26, 29, . . . .

When the detected identification information 25, 28, . . . is identification information 31 for access operation management information, if the optical disc driving apparatus 100 cannot identify the operation corresponding to the identification information, it performs the operations described in operation definition A 26, which indicates what to do in such an eventuality. If the access operation inhibition bit 32 is set to '1', a servo control signal S1 inhibiting access operations to the user data area 22 outward of the lead-in area 21 is supplied to the servo processor 13. Travel of the optical head into the user data area 22 is thereby inhibited, and a state of still (stationary) reproducing in the lead-in area 21 is entered.

Still (stationary) reproducing in the lead-in area 21 has been given as one example of access inhibition, but halt processing can be performed as in 1) and 2) below.

1) The two-axis driver 15 turns off focusing in the optical pickup 2, responsive to a focus control signal from the servo processor 13.

2) The automatic laser power controller (ALPC) 11 turns off the reproducing laser power in response to the laser control signal S2 from the system controller 12, halting emission of light.

When the result of the analysis of the operation management information 24 is that access to the user data area 22 is possible, read commands are issued from the host 10 and information is reproduced.

The optical disc driving apparatus 100 in this embodiment was a recording and reproducing apparatus described as playing a reproduce-only optical disc 1, but the embodiment is also applicable to write-once optical discs and rewritable optical discs such as DVD-R, DVD-RW, etc. When data are recorded on a write-once optical disc or a rewritable optical disc, the data, encoded and modulated by the encoder/decoder 7, are recorded by the optical pickup 2 at a predetermined recording laser power under control of the automatic laser power controller (ALPC) 11. The disc manufacturer pre-records the operation management information 24 in the lead-in area 21. Alternatively, if there are two types of areas in the lead-in area 21, one being a reproduce-only area and the other a write-once or a rewritable area, the disc manufacturer may pre-record in the reproduce-only area in the lead-in area 21, or the optical disc driving apparatus 100 may record operation management information 24 in the write-once or rewritable area in the lead-in area 21 at the request of the user or according to the type of data recorded. If the result of the analysis of the operation management information 24 carried out by the system controller 12 is that access to the user data area 22 is possible, write commands are issued from the host 10 and data are written or rewritten in the user data area 22.

In this embodiment, even if the optical disc 1 includes information that the optical disc driving apparatus cannot read, because the optical disc 1 is a new disc version or for some other such reason, if the access operation inhibition bit 32 is '1', access operations by the optical head to the user data area 22 can be inhibited to protect the contents of the optical disc, and to avoid optical disc damage and other worst-case scenarios.

Third Embodiment

The flow of operations when the optical disc 1 of the first embodiment is loaded into the optical disc driving apparatus 100 will be described with reference to FIG. 3.

When the optical disc 1 is loaded into the optical disc driving apparatus 100, the optical disc driving apparatus 100 executes a starting operation sequence in which, without relying on commands from the host 10, it automatically carries out various adjustments while obtaining various information from the optical disc 1. In the starting operation sequence, the operation management information extraction means 17 in the optical disc driving apparatus 100 obtains the operation management information 24 from the optical disc 1 and extracts the access operation identification information 31 (ST11), and the operation management information analysis means 18 decides whether the extracted information matches stored identification information (ST12). If the access operation identification information 31 matches, the optical disc driving apparatus 100 refers to operation definitions that it holds and decides on access operation restrictions (ST13) that determine whether or not to inhibit access operations. If the access operation identification information 31 does not match, that is, if the access operation identification information 31 is unintelligible to the optical disc driving apparatus 100, it obtains operation definitions 32 from the optical disc 1 and determines access operation restrictions according to those operation definitions 32 (ST14). After deciding on access operation restrictions that determine whether or not to inhibit access operations, it decides whether further operations in the starting sequence would infringe upon the access operation restrictions (ST15). If they would infringe, that is, if subsequent operations in the starting sequence are inhibited access operations, these operations are not carried out, the starting operations are halted, and a standby state is entered (ST16) in which the optical disc driving apparatus 100 waits for a command from the host 10. If they would not infringe, starting operations are continued, ending in a transition to the standby state in which the optical disc driving apparatus 100 waits for a command from the host 10 (ST17).

Figure 3:
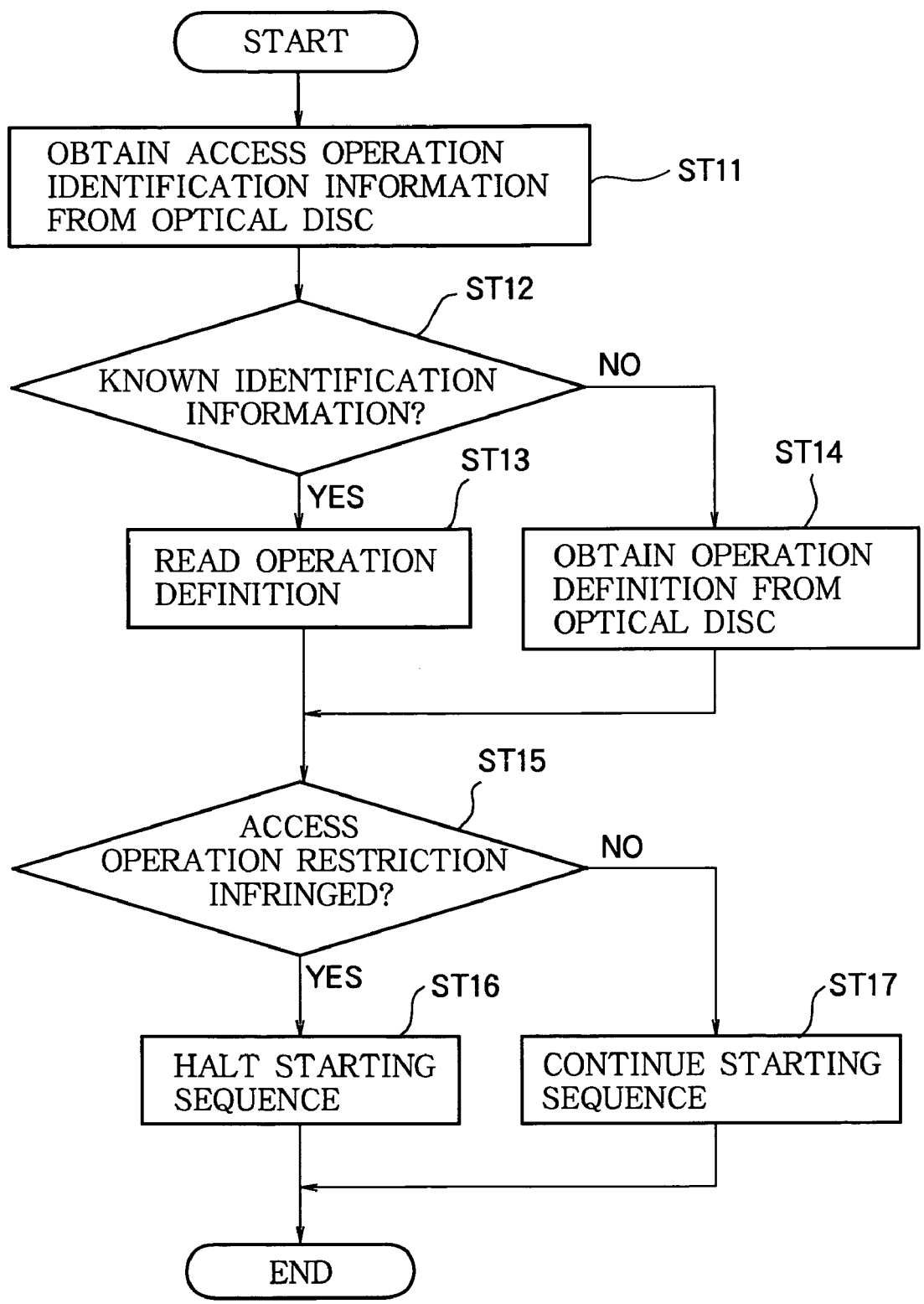
FIG. 3 is a flowchart illustrating operations in a third embodiment when an optical disc is loaded into an optical disc driving apparatus.
Figure 4:
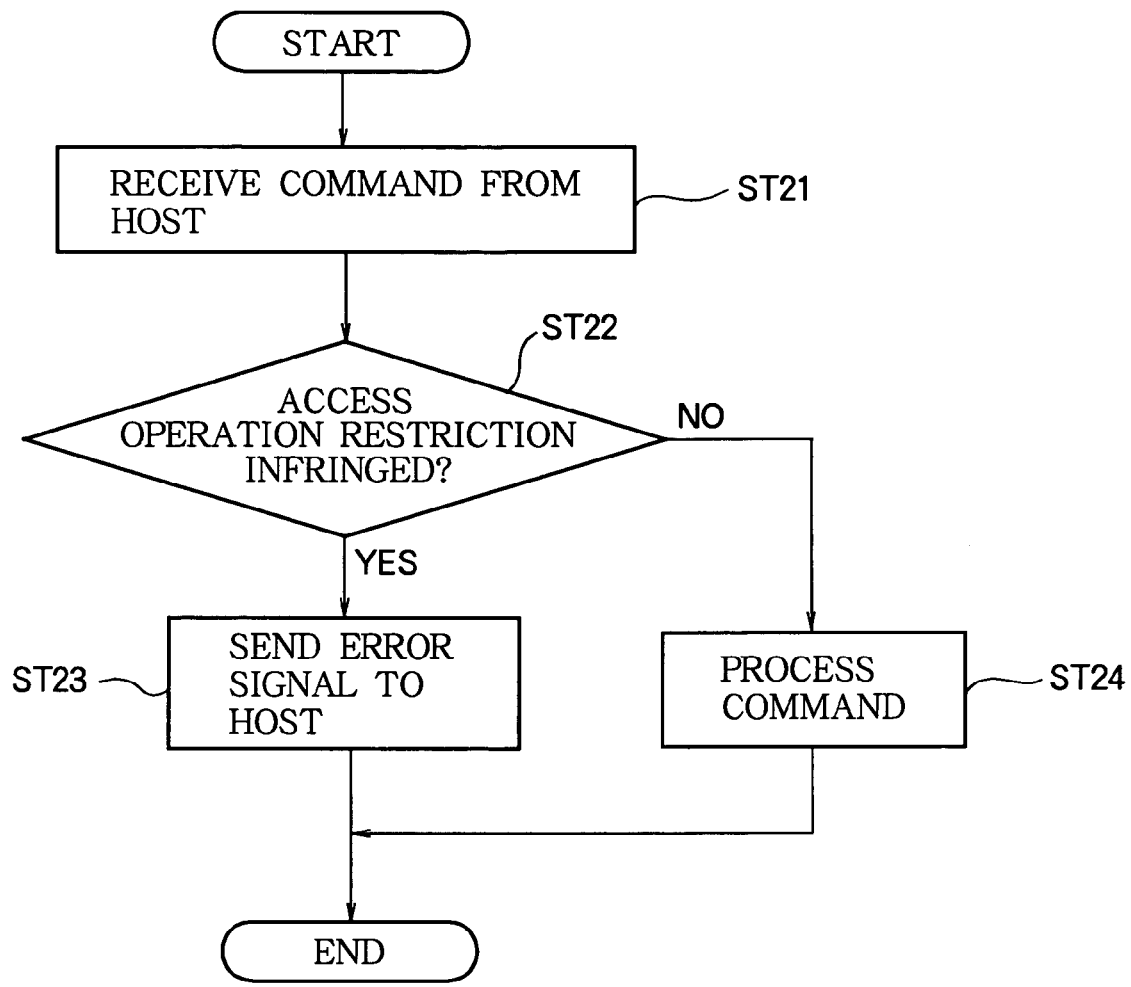
FIG. 4 is a flowchart illustrating operations in the third embodiment when the optical disc driving apparatus receives a command from its host.

Continuing, after the optical disc driving apparatus 100 has performed the sequence of starting operations in FIG. 3 and is in the standby state, when it receives a command from the host 10, it operates as shown in FIG. 4. When the optical disc driving apparatus 100 has completed the starting operations and is waiting for a command from the host 10, if it receives a command from the host 10 (ST21), it decides (ST22) whether or not the command infringes the access operation restrictions determined in step ST13 or ST14 in the starting sequence; if the command infringes, the optical disc driving apparatus 100 outputs an error signal to the host 10 (ST23) and immediately enters the command waiting state. If the command does not infringe the access operation restrictions determined in the starting sequence, it executes the command (ST24), then stands by and waits for another command.

In this embodiment, even if the optical disc 1 includes information that the optical disc driving apparatus cannot read, because the optical disc 1 is a new disc version or for some other such reason, if the access operation inhibition bit 32 is '1', control can be carried out to inhibit access operations by the optical head to the user data area 22, protecting the contents of the optical disc and avoiding optical disc damage and other worst-case scenarios.

Fourth Embodiment

In this embodiment, a hybrid optical disc 40 in which a standard-density recording area 41 coexists with a high-density recording area 42 having a higher linear density than the standard density will be described.

Figure 5:
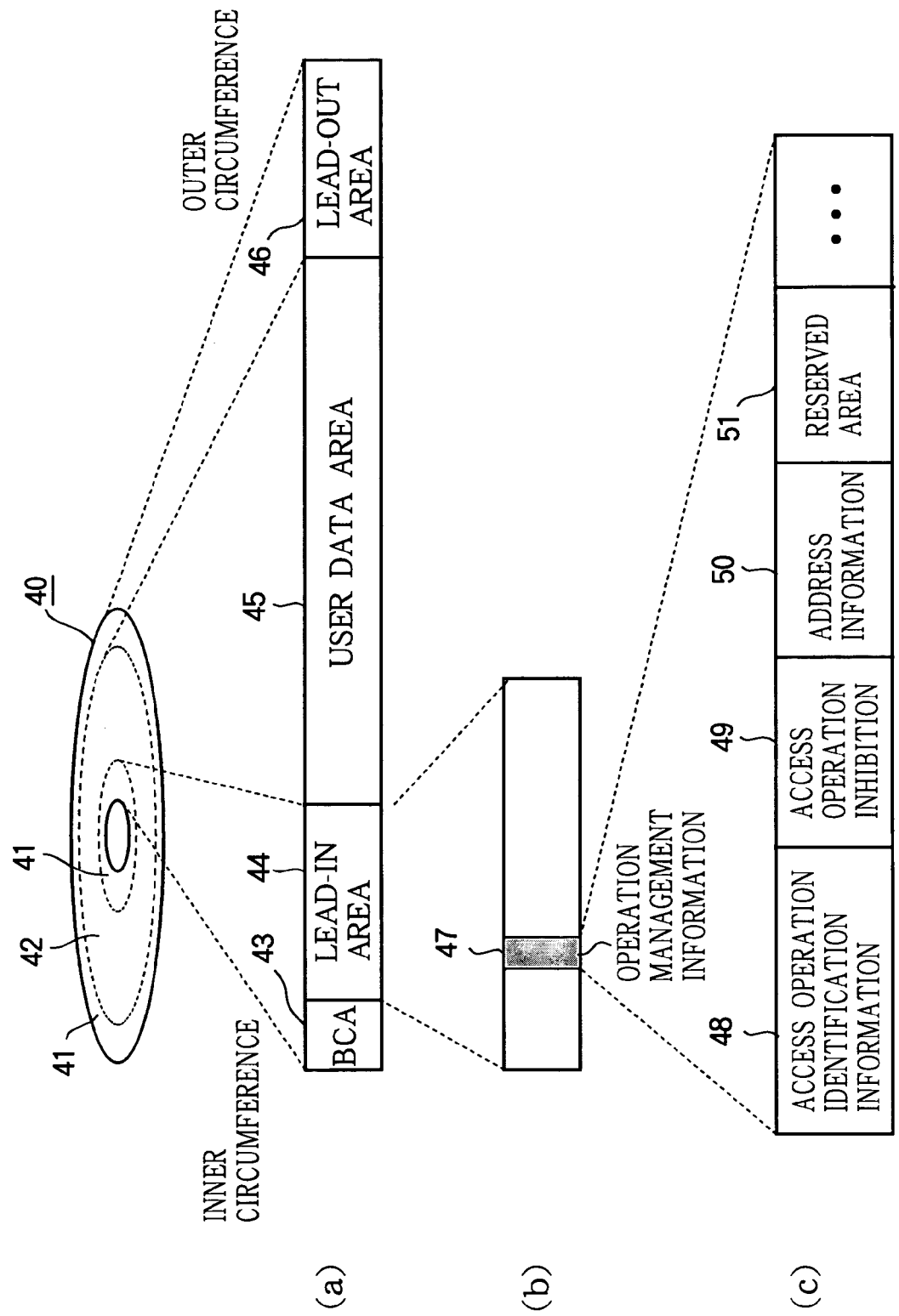
FIG. 5 is a drawing showing the recording area format of an optical disc in a fourth embodiment.

FIG. 5 illustrates the recording area format of the hybrid-optical disc 40 in this embodiment. Referring to FIG. 5 (a), the BCA area 43, lead-in area 44, and lead-out area 46 constitute the standard-density recording area 41, and the user data area 45 constitutes the high-density recording area 42. The standard-density recording area 41 is a reproduce-only area and the high-density recording area 42 is a rewritable area.

In this embodiment, besides the access operation identification information 48, access operation inhibition bit 49, and reserved area 51, address information 50 is recorded in the operation management information 47. The access operation identification information 48, access operation inhibition bit 49, and reserved area 51 are the same as in the first embodiment.

As the address information 50, the last address in the lead-in area 44 is recorded as a logical address referenced to the leading address of the lead-in area 44. In general, either a logical address or an absolute address may be used as the address information 50.

Figure 6:
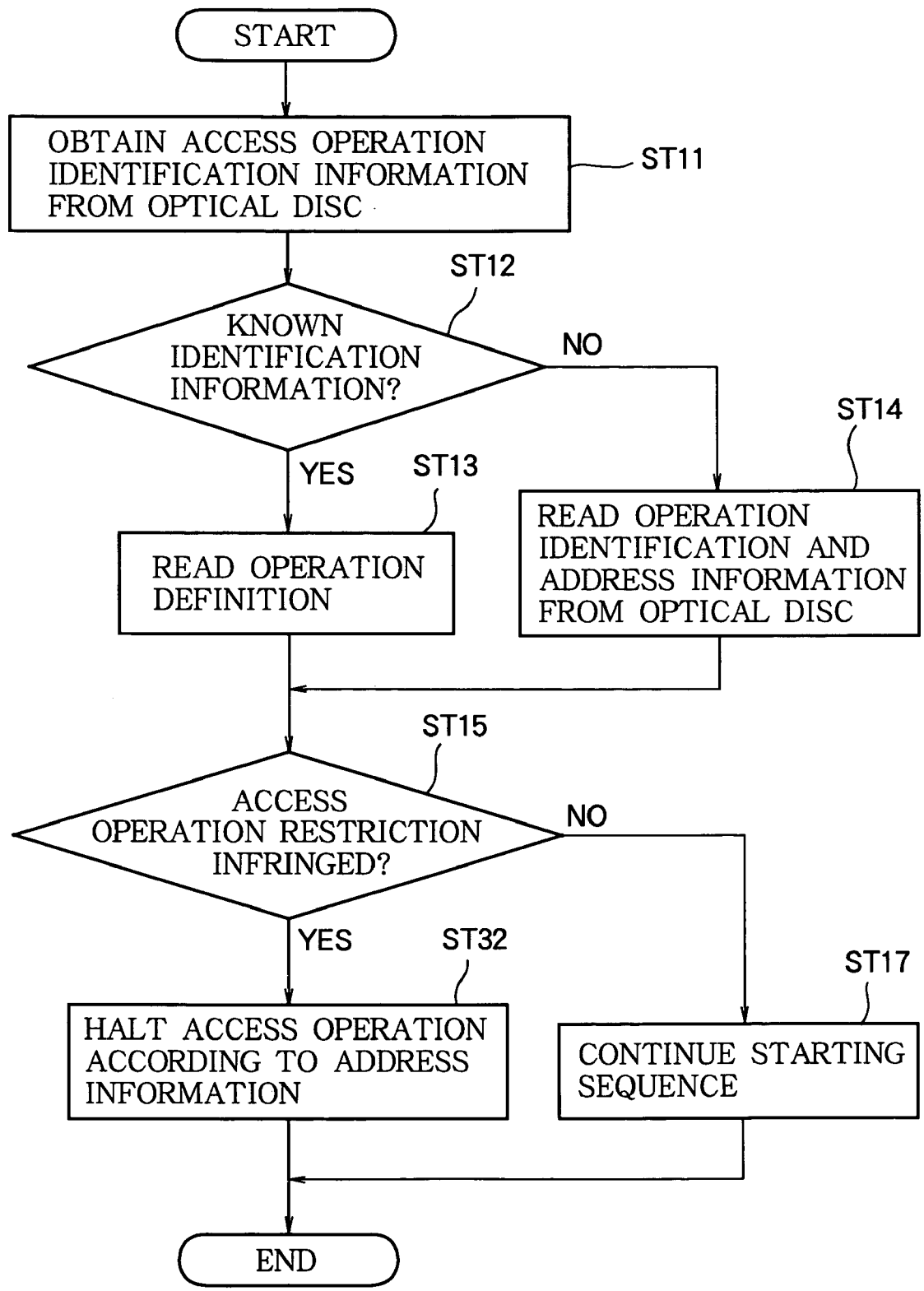
FIG. 6 is a flowchart illustrating operations in the fourth embodiment when the optical disc is loaded into an optical disc driving apparatus.

FIG. 6 illustrates the flow of operations when the hybrid optical disc 40 is loaded into an optical disc driving apparatus. The structure of the optical disk driving apparatus is the same as the optical disc driving apparatus 100 shown in the second embodiment.

In FIG. 6, steps ST11, ST12, and ST13 are the same as in the third embodiment. When the access operation identification information 48 is unintelligible to the optical disc driving apparatus 100, the operation management information extraction means 17 in the optical disc driving apparatus 100 obtains the access operation inhibition bit 49 and address information 50 from the hybrid optical disc 40, and determines access operation restrictions according to the access operation inhibition bit 49 (ST31). After deciding on access operation restrictions that determine whether or not to inhibit access operations, it decides whether further operations in the starting sequence would infringe upon the access operation restrictions (ST15). If they would infringe, that is, if subsequent operations in the starting sequence are inhibited access operations, these operations are halted according to the address information 50 that was obtained, and a standby state is entered in which the optical disc driving apparatus 100 waits for a command from the host 10 (ST32). If they would not infringe, starting operations are continued, ending in a transition to the standby state in which the optical disc driving apparatus 100 waits for a command from the host 10 (ST17). The flow of subsequent operations is the same as shown in FIG. 4.

As the hybrid optical disc 40, a disc having a standard-density recording area 41 and a high-density recording area 42 was described above, but a disc having areas with different physical properties such as material properties, linear velocity, reproducing laser power, or track pitch may be used. In such cases, as the address information 50, the address of a boundary between areas with mutually differing physical properties may be recorded, or the last address that can be read by the optical disc driving apparatus 100 may be recorded.

A disc having a reproduce-only area and a rewritable area was described above, but a disc having a reproduce-only area and a write-once area is also applicable; in addition, the lead-in area 44 and lead-out area 46 shown in the second embodiment may include both a reproduce-only area and a rewritable or write-once area.

Furthermore, the whole disc may constitute a reproduce-only area having a recording density that is not uniform but changes at some point. The whole disc area may also constitute a rewritable and/or a write-once area of this type.

According to this embodiment, in a hybrid optical disc 40 having a plurality of areas with mutually differing physical properties such as different linear recording densities, it is possible to prevent problems such as the loss of recorded information. In an optical disc driving apparatus into which such a hybrid optical disc is loaded for reproducing or recording, it is possible to prevent such problems as disabled disc rotation control, which may cause the spindle motor to run out of control, and disabled tracking control, which may cause the tracking actuator to burn out in the worst case.

Fifth Embodiment

Figure 7:
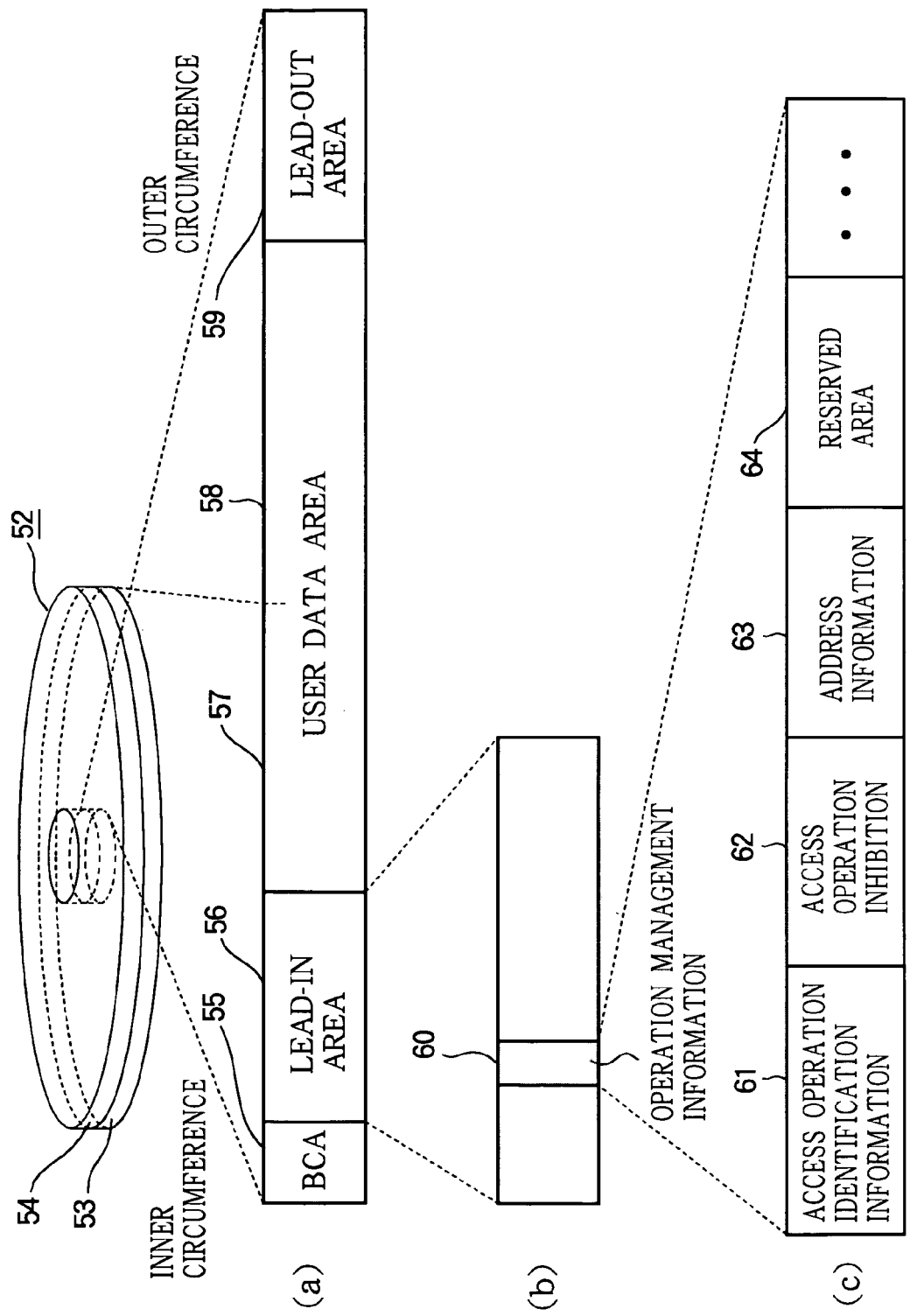
FIG. 7 is a drawing showing the recording area format in a fifth embodiment.

FIG. 7 illustrates the recording area format of a dual layer hybrid optical disc 52 in this embodiment. Referring to FIG. 7 (a), the first layer 53 is a standard-density recording area comprising the BCA area 55, one part of the user data area 57, and the remaining part of the user data area 58. The second layer 54 is a high-density recording area having a higher linear recording density than the standard density, and consists of the remaining part of the user data area 58 and the lead-out area 59. That is, there are two user data areas 57 and 58, one in the first layer 53 and one in the second layer 54, and the two user data areas 57, 58 have different linear recording densities. The user data areas 57, 58 are rewritable areas and the other areas are reproduce-only areas. Addresses in the first layer 53 are assigned sequentially from the inner radius to the outer radius of the disc, and addresses in the second layer 54 are assigned sequentially from the outer to the inner radius.

Referring to FIGS. 7 (b) and (c), the operation management information 60 in the lead-in area 56 comprises access operation identification information 61, an access operation inhibition bit 62, address information 63, and a reserved area 64.

The access operation identification information 61, access operation inhibition bit 62, and reserved area 64 are the same as in the first embodiment.

As the address information 63, the last address in the first layer 53, that is, the address of the boundary between areas having mutually differing linear recording densities, is recorded as a logical address referenced to the leading address of the user data area 57. In general, either a logical address or an absolute address may be used as the address information 63.

The flow of operations when the dual layer hybrid optical disc 52 above is loaded into an optical disc driving apparatus is the same as in the fourth embodiment.

As the dual layer hybrid optical disc 52, a disc in which the first layer 53 is a standard-density recording area and the second layer 54 is a high-density recording area was described above, but a disc of the opposite type may be used. As the dual layer hybrid optical disc 52, a disc having both standard-density and high-density recording areas was described, but as in the fourth embodiment, a disc having layers with different physical properties, such as different material properties, linear velocities, allowable reproducing laser power, or track pitch may be used. In such cases, as the address information 63, the address of a boundary between areas with mutually differing physical properties may be recorded, or the last address that can be read by the optical disc driving apparatus 100 may be recorded.

A disc having a reproduce-only area and a rewritable area was described above, but a disc having a reproduce-only area and a write-once area is also applicable; in addition, the lead-in area 56 and lead-out area 59 may include both a reproduce-only area and a rewritable or write-once area, as noted in the fourth embodiment.

Furthermore, the whole disc may constitute a reproduce-only area having a recording density that is not uniform but changes at some point. The whole disc may also constitute a rewritable and/or a write-once area of this type.

A disc having two layers was described, but the number of layers is not limited to two; it may be more than two.

According to this embodiment, in a dual layer hybrid optical disc 52 having a plurality of areas with mutually differing physical properties such as different linear recording densities, by reading the operation management information 60, it is possible to prevent problems such as loss of recorded information, because the operations of accessing the user data area 57 or 58 by the optical head can be inhibited. In an optical disc driving apparatus into which such a two-layer hybrid optical disc is loaded for reproducing or recording, it is possible to prevent such problems as disabled disc rotation control, which may cause the spindle motor to run out of control, and disabled tracking control, which may cause the tracking actuator to burn out in the worst case.

Sixth Embodiment

In this embodiment, information indicating the type of optical disc, more particularly, information indicating that the optical disc is a hybrid optical disc, is recorded as identification information in the operation management information.

Figure 8:
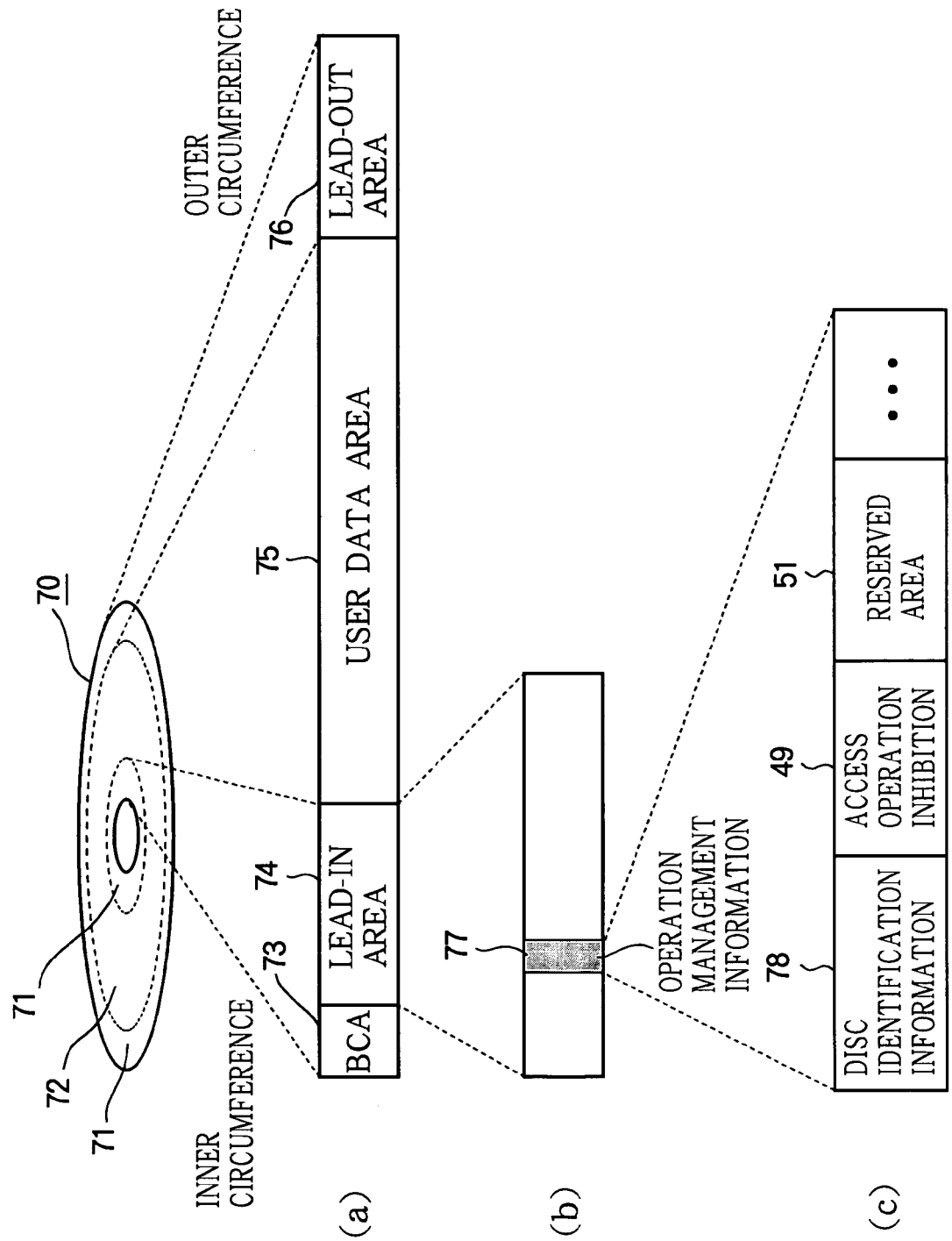
FIG. 8 is a drawing showing the recording area format of an optical disc in a sixth embodiment.

FIG. 8 illustrates the recording area format of an optical disc 70 in this embodiment. Referring to FIG. 8 (*a*), the BCA area 73, lead-in area 74, and lead-out area 76 constitute a standard-density recording area 71, and the user data area 75 constitutes a high-density recording area 72. The standard-density recording area 71 is a reproduce-only area, and the high-density recording area 72 is a rewritable area.

In this embodiment, in the operation management information 77, disc identification information 78 that indicates that the disc is a hybrid optical disc is recorded instead of the access operation identification information 48 recorded in the fourth embodiment above. The operation management information 77 itself in FIG. 8 (*b*) and, within it, the access operation inhibition bit 49 and reserved area 51 in FIG. 8 (*c*) are the same as in the fourth embodiment. More precisely, the operation management information 77 is the same as in the fourth embodiment except that the disc identification information 78 indicating that the disc is a hybrid optical disc is recorded in place of the access operation identification information 48 in the fourth embodiment.

The flow of operations when the optical disc 70 is loaded into an optical disc driving apparatus is the same as in the third embodiment, except that the operation management information extraction means 17 in the optical disc driving apparatus 100 obtains the operation management information 77 of the optical disc 70, extracts the disc identification information 78, and determines whether the disc identification information 78 matches identification information held in the operation management information analysis means 18.

According to this embodiment, reading the operation management information 77 makes it possible to inhibit operations by the optical head for accessing the user data area 75 even when the optical disc to be reproduced is a type of optical disc that the optical disc driving apparatus 100 cannot reproduce, so the contents of the optical disc can be protected, and optical disc damage and other worst-case scenarios can be avoided. In an optical disc driving apparatus into which such a hybrid optical disc 70 is loaded for reproducing or recording, it is possible to prevent such problems as disabled disc rotation control, which may cause the spindle motor to run out of control, and disabled tracking control, which may, in the worst case, cause the tracking actuator to burn out.

Seventh Embodiment

In this embodiment, a case in which information indicating the version of the standard is recorded as identification information will be described.

Figure 9:
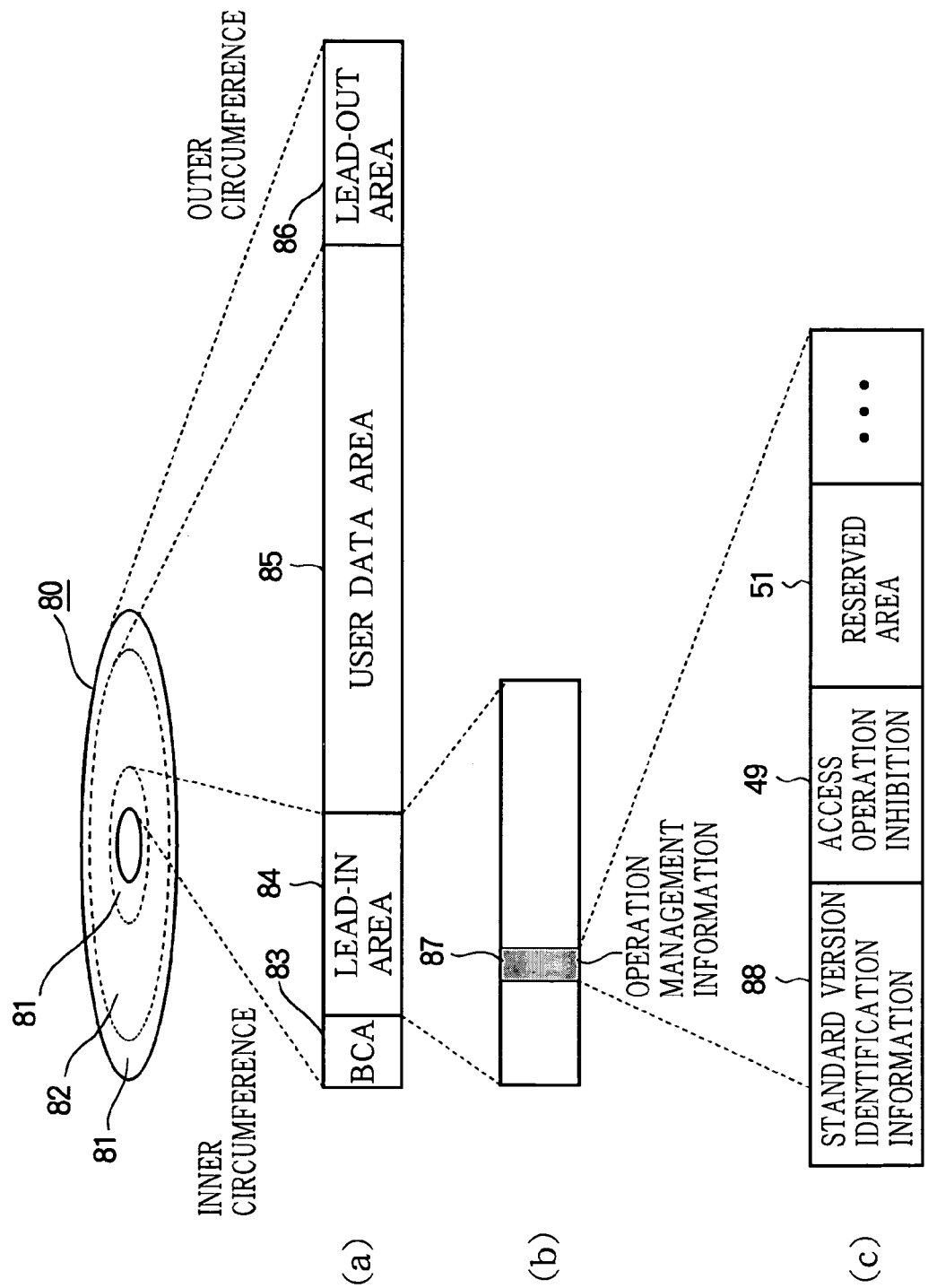
FIG. 9 is a drawing showing the recording area format of an optical disc in a seventh embodiment.

FIG. 9 illustrates the recording area format of an optical disc 80 in this embodiment. Referring to FIG. 9 (*a*), the BCA area 83, lead-in area 84, and lead-out area 86 constitute a standard-density recording area 81, and the user data area 85 constitutes a high-density recording area 82. The standard-density recording area 81 is a reproduce-only area, and the high-density recording area 82 is a rewritable area.

In this embodiment, in the operation management information 87, standard version identification information 88 that indicates the version of the standard to which the optical disc 80 conforms is recorded. The operation management information 87 shown in FIG. 8 (*b*) and, within it, the access operation inhibition bit 49 and reserved area 51 in FIG. 8 (*c*) are the same as in the fourth embodiment. More precisely, the operation management information 87 is the same as in the fourth embodiment except that it includes standard version identification information 88 indicating the version of the standard to which the optical disc 80 conforms instead of the access operation identification information 48 in the fourth embodiment.

The flow of operations when the optical disc 80 is loaded into the optical disc driving apparatus 100 is the same as in the third embodiment, except that the operation management information extraction means 17 in the optical disc driving apparatus 100 obtains the operation management information 87 of the optical disc 80, extracts the standard version identification information 88, and determines whether the standard version identification information 88 matches identification information held in the operation management information analysis means 18.

In the sixth and seventh embodiments as described above, no address information is recorded in the operation management information 77 and operation management information 87, but of course address information may be recorded. Furthermore, instead of the disc identification information 78 and standard version identification information 88 recorded in the sixth and seventh embodiments, identification information indicating other physical properties of the optical disc, such as its multi-layer structure, recording density, linear velocity, track pitch, maximum reproducing power, or maximum write power (recording power) may be recorded.

According to this embodiment, reading the operation management information 87 makes it possible to inhibit operations by the optical head for accessing the user data area 85 even when the optical disc to be reproduced is a type of optical disc that the optical disc driving apparatus 100 cannot reproduce, so the contents of the optical disc can be protected, and optical disc damage and other worst-case scenarios can be avoided. In an optical disc driving apparatus into which an optical disc 80 conforming to a version of a standard that is not supported by the optical disc driving apparatus is loaded for reproducing or recording, it is possible to prevent such problems as disabled disc rotation control, which may cause the spindle motor to run out of control, and disabled tracking control, which may, in the worst case, cause the tracking actuator to burn out.

Eighth Embodiment

Figure 10:
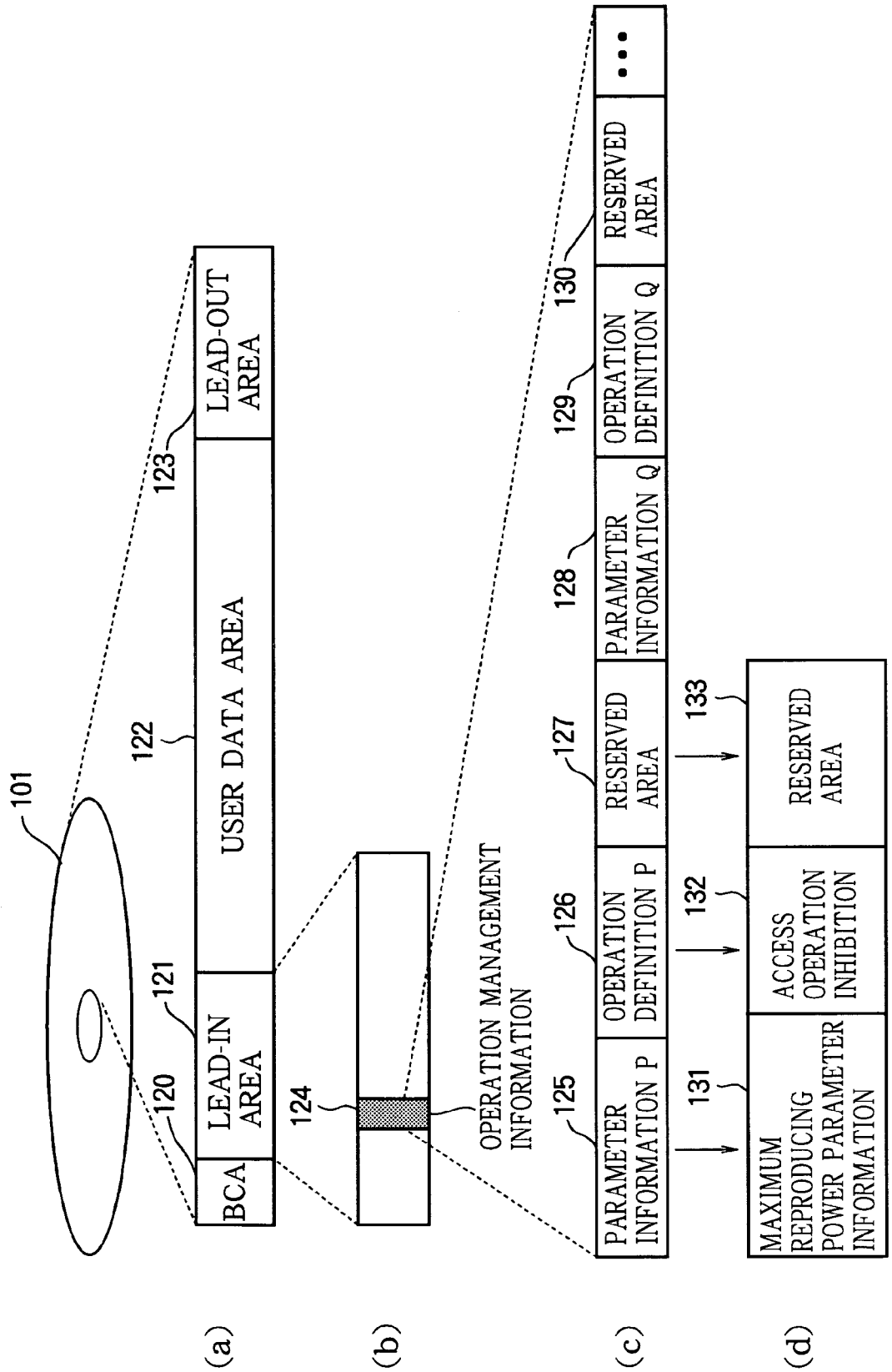
FIG. 10 is a drawing showing the recording area format of an optical disc in an eighth embodiment.

FIG. 10 illustrates the recording area format of the optical disc 101 in this embodiment. Referring to FIG. 10 (a), the recording area comprises a BCA area 120, a lead-in area 121, a user data area 122 in which content data are recorded, and a lead-out area 123 in which the same information as in the lead-in area 121 is recorded.

As shown in FIG. 10 (b), the information recorded in the lead-in area 121 includes operation management information 124 for controlling operations of an optical disc driving apparatus into which the optical disc 101 is loaded.

FIG. 10 (c) shows the recording format of the operation management information 124. Referring to the drawing, the operation management information 124 comprises parameter information 125, 128, . . . in which parameters for reproducing the optical disc 101 are recorded, operation definitions 126, 129, . . . that define operations carried out by the optical disc driving apparatus when the optical disc driving apparatus cannot satisfy the conditions indicated by the parameter information 125, 128, . . . , and reserved areas 127, 130, . . . that are reserved for recording information that may be defined in the future.

As shown in FIG. 10 (d), the operation control information recorded in parameter information P 125 and operation definition P 126 is access operation control information for controlling access operations (seek operations) by the optical head of the optical disc driving apparatus to the user data area 122. More specifically, maximum reproducing power parameter information 131 for the laser beam used for reading the optical disc 101 is given in parameter information P 125. An access operation inhibition bit 132 that determines whether access operations to the user data area 122 are inhibited or not when the optical disc driving apparatus into which the optical disc 101 is loaded cannot satisfy the condition indicated by the maximum reproducing power parameter information 131 is assigned to operation definition P 126. For example, if the maximum reproducing power parameter information 131 of the optical disc 101 is N and the optical disc driving apparatus cannot set the reproducing power to a value past M (M>N), the optical disc driving apparatus cannot satisfy the reproducing power condition N specified as the maximum reproducing power parameter information 131 of the optical disc 101.

When the optical disc driving apparatus recognizes that it cannot satisfy the condition indicated by the maximum reproducing power parameter information 131 of the optical disc 101 loaded into it and the access operation inhibition bit 132 is '1', it halts access operations to the user data area 122 and the optical head stops reading. If the access operation inhibition bit 132 is '0', the optical disc driving apparatus continues normal operations without halting, even though it cannot satisfy the condition indicated by the maximum reproducing power parameter information 131. When the optical disc driving apparatus can satisfy the condition indicated by the maximum reproducing power parameter information 131, it continues normal operations.

According to this embodiment, an optical disc driving apparatus that cannot satisfy the condition indicated by the maximum reproducing power parameter information 131 and accordingly can read the optical disc 101 only with reproducing power exceeding that condition can inhibit access operations to the user data area 122, thereby avoiding worst-case scenarios such as corruption of content of the optical disc by laser overpower and loss of recorded information.

In this embodiment, a case in which the maximum reproducing power parameter information 131 is recorded as the parameter information 125, 128, . . . was described, but the maximum write power (recording power) value may be recorded. Other parameter information concerning the optical disc 101 that affects recording or reproducing conditions of the optical disc driving apparatus, or parameter information indicating the recording or reproducing conditions directly, may also be recorded.

It is also possible to record the maximum reproducing power and maximum write power (recording power) as identification information that indicates the physical properties of an optical disc in the sixth and seventh embodiments, but the eighth embodiment differs from the sixth and seventh embodiments in that, while the sixth and seventh embodiments inhibit access operations by the optical head when the optical disc driving apparatus cannot recognize the maximum reproducing power or the maximum write power, the eighth embodiment inhibits access operations by the optical head when the optical disc driving apparatus cannot satisfy the maximum reproducing power or maximum write power (recording power) condition.

Ninth Embodiment

Operations when the optical disc 101 in the eighth embodiment is loaded into the optical disc driving apparatus 100 in the second embodiment will be described with reference to FIG. 2.

The operation management information extraction means 17 in the encoder/decoder 7 extracts the operation management information 124 from the optical disc 101 and outputs it to the system controller 12. The operation management information 124 is analyzed by the operation management information analysis means 18 in the system controller 12. More specifically, first the system controller 12 detects the parameter information 125, 128, . . . in the operation management information 124; if the optical disc driving apparatus 100 can satisfy the conditions of the detected parameter information 125, 128, . . . , normal operation proceeds; if it cannot satisfy the parameter information 125, 128, . . . , the operation is controlled according to the operation definitions 126, 129, . . . .

When maximum reproducing power parameter information 131 is detected, if the optical disc driving apparatus 100 cannot set the maximum reproducing power corresponding to the maximum reproducing power parameter information 131 and can operate only with a reproducing power higher than the maximum reproducing power parameter information 131, it performs the operations described in operation definition P 126, which indicates what to do in this eventuality. If the access operation inhibition bit 32 is set to '1', a servo control signal S1 inhibiting access operations to the user data area 122 outward of the lead-in area 121 is supplied to the servo processor 13. Travel of the optical head into the user data area 122 is thereby inhibited, and a state of still (stationary) reproducing in the lead-in area 121 is entered.

Still (stationary) reproducing in the lead-in area 121 has been given as one example of access inhibition, but halt processing can be performed as described in items 1) and 2) in the second embodiment above.

When the result of the analysis of the operation management information 124 is that access to the user data area 122 is possible, read commands are issued from the host 10 and information is reproduced.

According to this embodiment, if the optical disc driving apparatus cannot satisfy the condition indicated by the maximum reproducing power parameter information 131 and accordingly can read the optical disc 101 only with a reproducing power exceeding that condition, access operations to the user data area 122 can be inhibited, thereby avoiding worst-case scenarios such as corruption of content of the optical disc by laser overpower and loss of recorded information.

Tenth Embodiment

Figure 11:
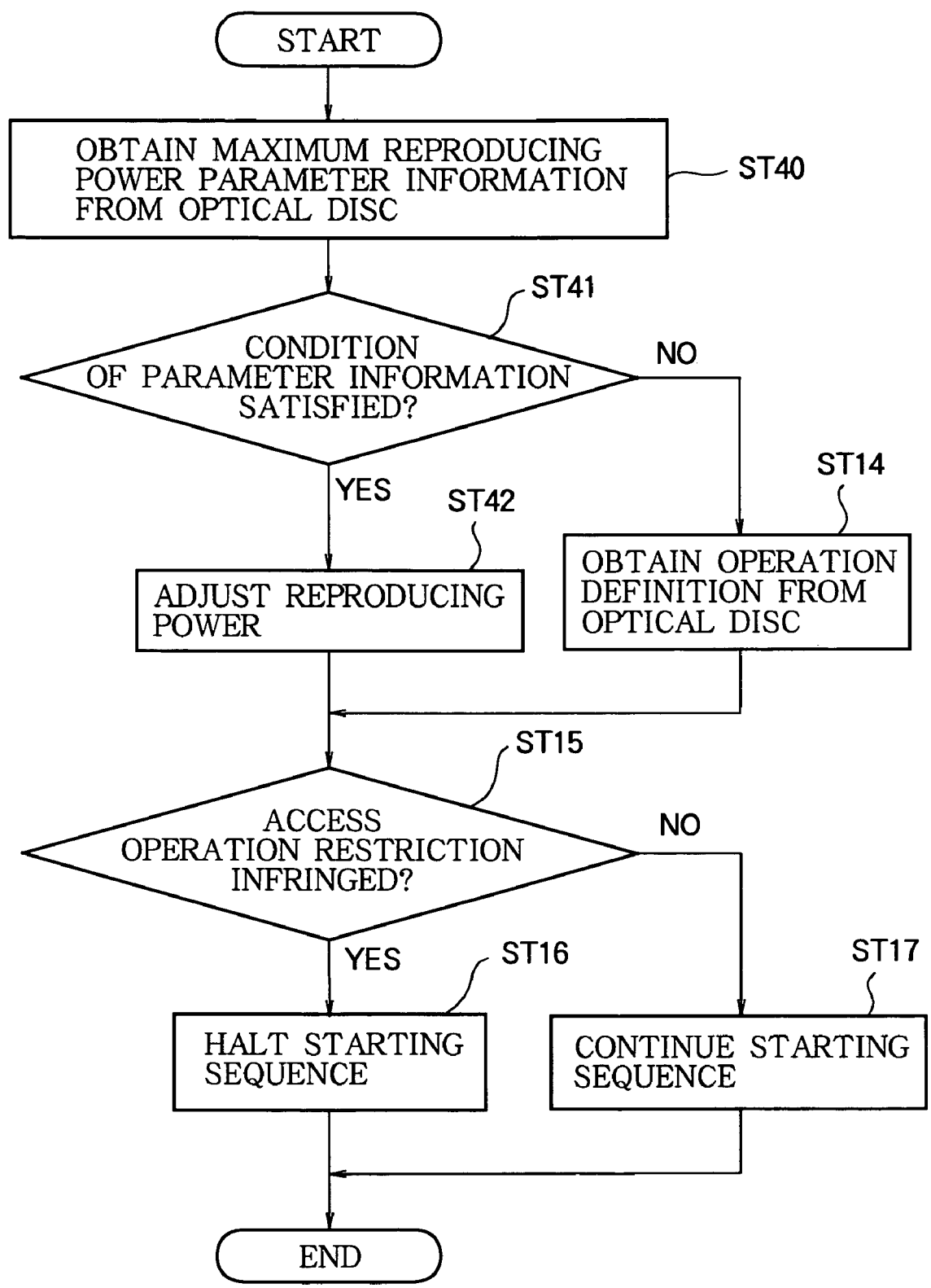
FIG. 11 is a flowchart illustrating operations in a tenth embodiment when an optical disc is loaded into an optical disc driving apparatus.

The flow of operations when the optical disc 101 in the eighth embodiment is loaded into the optical disc driving apparatus 100 will be described with reference to FIG. 11. Steps with the same reference numbers as in FIG. 3 are the same as in FIG. 3.

In the starting operation sequence, the operation management information extraction means 17 in the optical disc driving apparatus 100 obtains the operation management information 124 from the optical disc 101 and extracts the maximum reproducing power parameter information 131 (ST40). The operation management information analysis means 18 compares the extracted information with its stored parameter information and decides whether the optical disc driving apparatus 100 satisfies the condition indicated by the maximum reproducing power parameter information 131 (ST41). If it satisfies the maximum reproducing power parameter information 131, the optical disc driving apparatus 100 adjusts the reproducing power, referring to the range defined by the parameter information stored in the optical disc driving apparatus 100, subject to the condition indicated by the maximum reproducing power parameter information 131 (ST42). If the optical disc driving apparatus 100 cannot satisfy the condition of the maximum reproducing power parameter information 131, more specifically, if the optical disc driving apparatus 100 cannot set its maximum reproducing power according to the condition defined by the maximum reproducing power parameter information 131, it obtains an operation definition 132 from the optical disc 101 and determines access operation restrictions according to that operation definition 132 (ST14). After deciding on access operation restrictions that determine whether or not to inhibit access operations, as described above, the optical disc driving apparatus 100 decides whether further operations in the starting sequence would infringe upon the access operation restrictions (ST15). If they would infringe, that is, if subsequent operations in the starting sequence are inhibited access operations, these operations are not carried out, the starting sequence is halted, and a standby state is entered (ST16) in which the optical disc driving apparatus 100 waits for a command from the host 10. If they would not infringe, starting operations are continued, ending in a transition to the standby state in which the optical disc driving apparatus 100 waits for a command from the host 10 (ST17).

According to this embodiment, even if the optical disc driving apparatus cannot satisfy the condition indicated by the maximum reproducing power parameter information 131 and accordingly can read the optical disc 101 only with a reproducing power exceeding that condition, access operations to the user data area 122 can be inhibited, thereby avoiding worst-case scenarios such as corruption of content of the optical disc by laser overpower and loss of recorded information.

Eleventh Embodiment

This embodiment will describe a case in which reproducing identification information indicating whether information recorded in a given area of an optical disc can be reproduced under the reproducing conditions of the optical disc driving apparatus is recorded as the access operation identification information described in the previous embodiment.

Figure 12:
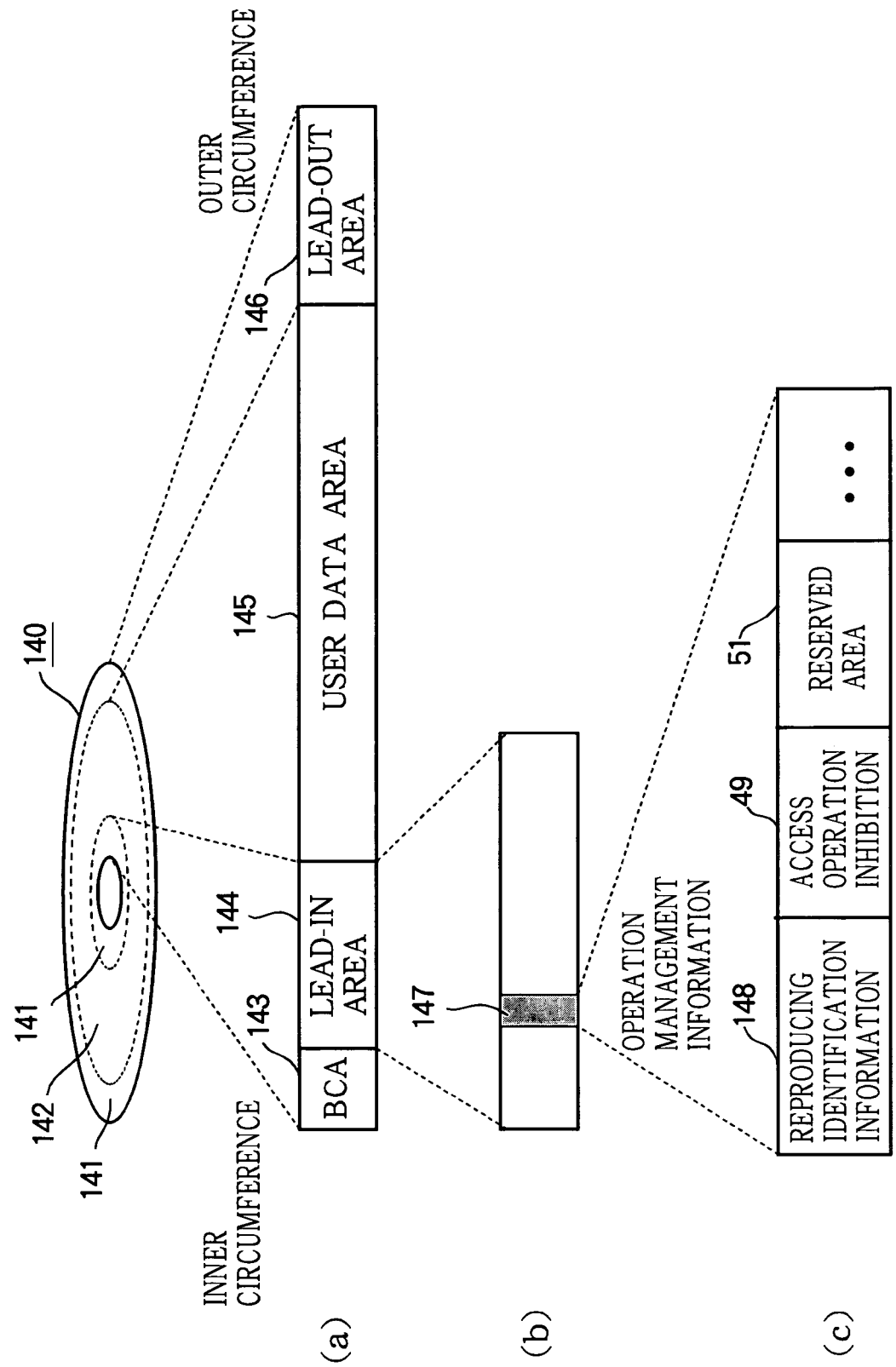
FIG. 12 is a drawing showing the recording area format of an optical disc in an eleventh embodiment.

FIG. 12 illustrates the recording area format of the optical disc 140 in this embodiment. Referring to FIG. 12 (a), the BCA area 143, lead-in area 144, and lead-out area 146 constitute a standard-density recording area 141, and the user data area 145 constitutes a high-density recording area 142. The standard-density recording areas 141 are reproduce-only areas, and the high-density recording area 142 is a rewritable area.

Figure 13:
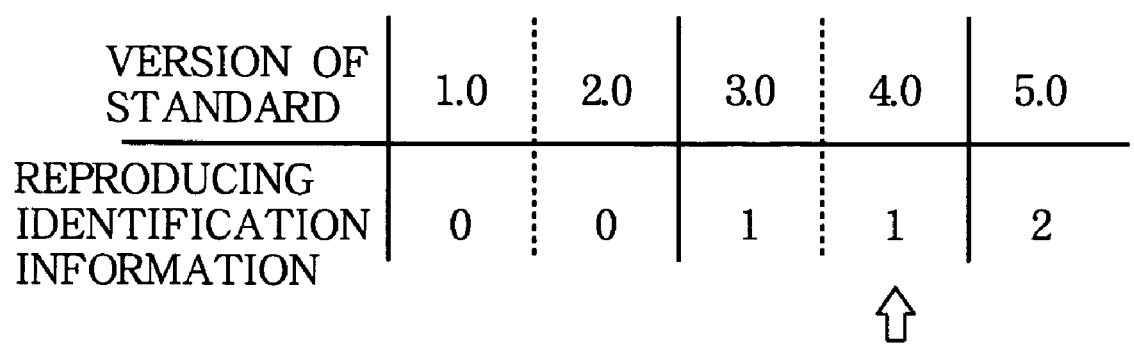
FIG. 13 is a drawing showing the relationship between specification version information and reproducing type information.

In this embodiment, in the operation management information 147, reproducing identification information 148 indicating whether the information recorded in the user data area 145 of the optical disc 140 can be reproduced under the reproducing conditions of the optical disc driving apparatus is recorded. If the version of the standard to which the optical disc 140 confirms is Ver. (version) 4.0, as exemplified in FIG. 13, the reproducing identification information 148 indicates whether an optical disc driving apparatus that was designed to a standard specified in a preceding version can reproduce the optical disc 140 under the reproducing conditions of the optical disc driving apparatus. In the case shown in FIG. 13, the optical disc 140 was recorded in the Ver. 4.0 standard format, for which the reproducing identification information 148 is '1', and cannot be reproduced under the conditions of an optical disc driving apparatus that was designed to Ver. 1.0 or Ver. 2.0 of the standard, for which the reproducing identification information is '0'. It can, however, be reproduced by an optical disc driving apparatus that was designed to Ver. 3.0 of the standard, for which the reproducing identification information is '1'.

The operation management information 147 and the access operation inhibition bit 49 and reserved area 51 included therein, shown in FIGS. 12 (b) and (c), are the same as in the fourth embodiment: the same, that is, except that, instead of the access operation identification information 48 in the fourth embodiment, the reproducing identification information 148 is recorded, indicating whether information recorded in the user data area 145 of the optical disc 140 can be reproduced.

The flow of operations when the optical disc 140 is loaded into the optical disc driving apparatus 100 for reproducing is the same as in the third embodiment, except that in steps ST11 and ST12, the operation management information extraction means 17 in the optical disc driving apparatus 100 obtains the operation management information 147 of the optical disc 140, extracts the reproducing identification information 148, and determines whether it matches identification information held by the operation management information analysis means 18.

The reproducing identification information 148 is updated when an optical disk cannot be reproduced unless the reproducing conditions of the optical disc driving apparatus are changed. The update is carried out when the standard is written or revised, if the physical properties of the optical disc are altered to such a degree that it cannot be reproduced unless the reproducing conditions of the optical disc driving apparatus are changed. For example, an update is carried out for an optical disc consisting of a plurality of areas with different linear densities, such as a hybrid optical disc or a dual-layer hybrid optical disc, as described in the fourth and fifth embodiments, or when the value of the maximum reproducing laser power is greatly changed.

In this embodiment, a case in which address information is not recorded in the operation management information 147 was described, but it goes without saying that address information may be recorded there.

According to this embodiment, even if the optical disc driving apparatus reproduces an optical disc 140 for which it does not have reproducing compatibility, and thus cannot reproduce without altering its reproducing conditions, access operations (seek operations) by the optical head to the user data area 145 can be inhibited by reading the operation management information 147, thereby protecting the content of the optical disc 140 and accordingly avoiding worst-case scenarios such as corruption of content of the optical disc by laser overpower, and loss of recorded information. In an optical disc driving apparatus that drives such an optical disc 140 for which the reproducing identification information 148 indicates that it does not have reproducing compatibility, it is also possible to prevent such problems as disabled disc rotation control, which may cause the spindle motor to run out of control, and disabled tracking control, which may cause the tracking actuator to burn out.

Reproducing identification information 148 was described in this embodiment, but the identification information may instead indicate whether the user data area 145 (the given area) of an optical disc can be recorded on under the recording conditions of the optical disc driving apparatus. Reproducing identification information 148 and recording identification information are both access operation identification information indicating whether an access operation on the user data area 145 of an optical disc is possible, and by storing operation management information 147 including such access operation identification information in the optical disc, the content of the optical disc 140 can be protected during reproducing or recording, avoiding worst-case scenarios such as damage to the optical disc.

Twelfth Embodiment

In the following embodiments, instead of operation management information having identification information and operation definitions, disc management information having reproducing identification information as identification information but lacking operation definitions is stored.

FIG. 14 illustrates the recording area format of the optical disc 201 in this embodiment. As shown in FIG. 14 (*a*), from its inner edge to its outer edge, the optical disc 201 comprises a BCA (Burst Cutting Area) 220 in which information is recorded when the fabrication of the optical disc 1 has been completed, a lead-in area 221 in which information about the physical properties of the optical disc 201 is recorded, a user data area 222 in which content data are recorded, and a lead-out area 223 in which the same information is recorded as in the lead-in area 221. Reproduction by the optical disc driving apparatus proceeds sequentially outward from the inner circumference of the optical disc 201.

As shown in FIG. 14 (*b*), disc management information 224 for management of disc information used in reproducing the optical disc 201 is recorded in the lead-in area 221.

FIG. 14 (*c*) illustrates the recording format of the disc management information 224. Referring to FIG. 14 (*c*), the disc management information 224 includes reproducing identification information 225 that indicates whether it is possible to reproduce the information that was recorded in the user data area 222 of the optical disc 201 under the reproducing conditions of the optical disc driving apparatus. The reproducing identification information 225 is the same as the reproducing identification information 148 described in the eleventh embodiment, but no access operation inhibition bit 49 is stored. An optical disc driving apparatus that does not match the reproducing identification information 225 stored in the disc management information 224 inhibits access operations by its optical head because it does not possess reproducing compatibility with the optical disc 201.

The reproducing identification information 225 is updated if an optical disk cannot be reproduced unless the reproducing conditions of the optical disc driving apparatus are changed. The update is carried out when the standard is written or revised, if the physical properties of the optical disc are altered to such a degree that it cannot be reproduced unless the reproducing conditions of the optical disc driving apparatus are changed. For example, an update is carried out for an optical disc consisting of a plurality of areas with different linear densities, such as a hybrid optical disc or a dual-layer hybrid optical disc, as described in the fourth and fifth embodiments, or when the value of the maximum reproducing laser power is greatly changed.

Assume, for example, an optical disc driving apparatus that can reproduce an optical disc on which a recording was made at a standard density. For a hybrid optical disc that has standard-density recording areas and high-density recording areas, problems such as disabled disc rotation control, which may cause the spindle motor to run out of control, and disabled tracking control, which may cause the tracking actuator to burn out, may occur unless the optical disc driving apparatus sets different reproducing conditions for the high-density recording areas and standard-density recording areas. When the reproducing conditions have to be altered for this reason, the reproducing identification information 225 is altered.

As another example, for an optical disc with a maximum reproducing power parameter differing as described in the eighth embodiment, if the maximum reproducing laser power parameter has been reduced, as compared with the value for existing optical discs, problems such as loss of information may occur unless the optical disc driving apparatus reduces its reproducing laser power, so the reproducing identification information 225 is altered so as to alter the reproducing conditions.

When such an optical disc 201 is reproduced by an optical disc driving apparatus made before the reproducing identification information 225 was altered, since the optical disc driving apparatus does not match the reproducing identification information 225 recorded in the optical disc 201, no access operations to the user data area 222 of the optical disc 201 are carried out by the optical head of the optical disc driving apparatus.

Referring to FIG. 14 (c), the disc management information 224 includes disc category information 226 and version information 227 in addition to the reproducing identification information 225. The disc category information 226 indicates the category to which the optical disc belongs: the category of reproduce-only optical discs, the category of write-once optical discs, or the category of rewritable optical discs. The version information 227 indicates the version of the standard to which the optical disc conforms.

The disc category information 226 represents the broadest category of the disc and the version information 227 represents the narrowest category of the disc. More specifically, the above reproducing identification information 225 is related to the disc category information 226 and version information 227 in such a manner that the disc category information 226 indicates the disc category, the reproducing identification information 225 indicates the reproducing compatibility of the disc within the category, and the version information 227 distinguishes the version of the standard within the reproducing compatibility indicated by the reproducing identification information 225. Therefore, as already described with reference to FIG. 13, even when the version information 227 in one of two optical discs with differing version information 227 is newer than in the other, if reproducing compatibility is maintained, it is not necessary to alter the reproducing identification information 225.

In this embodiment, the disc management information 224 is recorded in the lead-in area 221, but it may be recorded in the BCA area 220 or lead-out area 223.

Figure 15A:
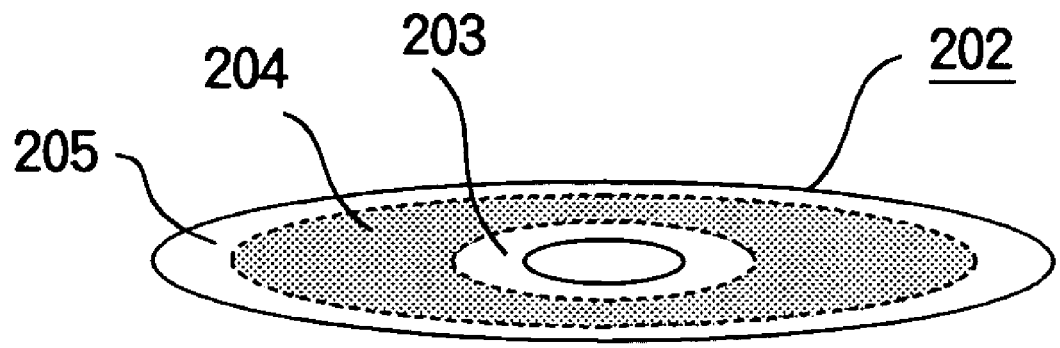
FIG. 15 is a drawing schematically showing an optical disc comprising areas with a plurality of linear densities.
Figure 15B:
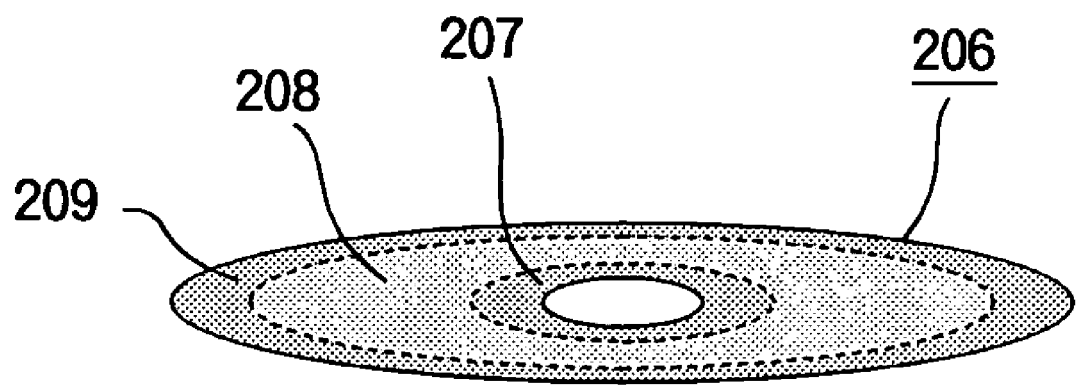

For an optical disc comprising areas having a plurality of linear densities, the reproducing identification information 225 is recorded in an area of comparatively low linear density, preferably in the area of lowest linear density. Assume, for example, an optical disc driving apparatus able to accept an optical disc 202 comprising standard density areas 203, 205 and a somewhat higher linear density area 204 as shown in FIG. 15 (a). An optical disc 206 with higher recording densities overall than those of the optical disc 202 comprises high-density recording areas 207, 209 and an ultra-high-density recording area 208 as shown in FIG. 15 (b). An old optical disc driving apparatus that can play optical disc 202 but does not match the reproducing identification information 225 of optical disc 206 cannot read the ultra-high-density recording area 208, which corresponds to the user data area, but can reproduce the high-density recording areas 207, 209, so it can at least read the reproducing identification information 225, which reliably enables it to inhibit access operations to the ultra-high-density recording area 208.

In an optical disc comprising a reproduce-only area and a rewritable area or a write-once area, the reproducing identification information 225 is recorded in the reproduce-only area. When the optical disc is a rewritable disc or a write-once disc, a reproduce-only area or non-rewritable area is included at least in the lead-in area 221 and lead-out area 223, so reading the reproducing identification information 225 included in the reproduce-only area can reliably inhibit access operations to the user data area 222.

In the description above, the area to which access operations were inhibited when it was recognized that the optical disc driving apparatus did not match the reproducing identification information 225 was the user data area 222, but access operations may be halted immediately without even reading the rest of the lead-in area 221.

An example in which the optical disc 201 was a reproduce-only optical disc such as a DVD-ROM disc was shown above; in this case, the disc management information 224 is preferably pre-recorded by the optical disc manufacturer.

According to this embodiment, even if the optical disc driving apparatus plays an optical disc 201 for which it does not have reproducing compatibility and thus cannot play without altering its reproducing conditions, access operations by the optical head to the user data area 222 can be inhibited by reading the reproducing identification information 225 in the lead-in area 221, thereby protecting the content of the optical disc 201 and accordingly avoiding worst-case scenarios such as damage to the optical disc. Providing the reproducing identification information 225 separately from the version information of the standard enables reproducing compatibility to be determined just by reading the reproducing identification information 225, so optical disc driving apparatus and optical discs can be effectively protected.

Reproducing identification information 225 was described in this embodiment, but recording identification information may be used as noted in the eleventh embodiment.

The version information 227 may be altered in response to each new version of the standard, but it need not be altered when the changes in the standard are very minor and accordingly do not affect reproducing compatibility and recording compatibility. In this case, the version information 227 may also be altered when reproducing compatibility can be maintained but recording compatibility cannot, such as when recording cannot be performed under some of the recording conditions (such as conditions for high-speed recording) used in older types of optical disc driving apparatus.

When an optical disc conforms to a plurality of standards, the version information 227 above may record a plurality of versions of the standards. In this case, the version information 227 may be recorded together with information indicating the type of standard so that the plurality of standards to which the optical disc conforms can be distinguished.

The disc management information 224 may also include information on the disc capacity and maximum transfer rate.

Access operation identification information including the reproducing identification information and recording identification information described above can be stored in an optical disc to protect the content of the optical disc 201 during reproducing or recording, thereby avoiding worst-case scenarios such as damage to the optical disc. Providing such access operation identification information separately from the version information of the standard enables reproducing compatibility to be determined just by reading the reproducing identification information 225, so optical disc driving apparatus and optical discs can be effectively protected.

Thirteenth Embodiment

Figure 16:
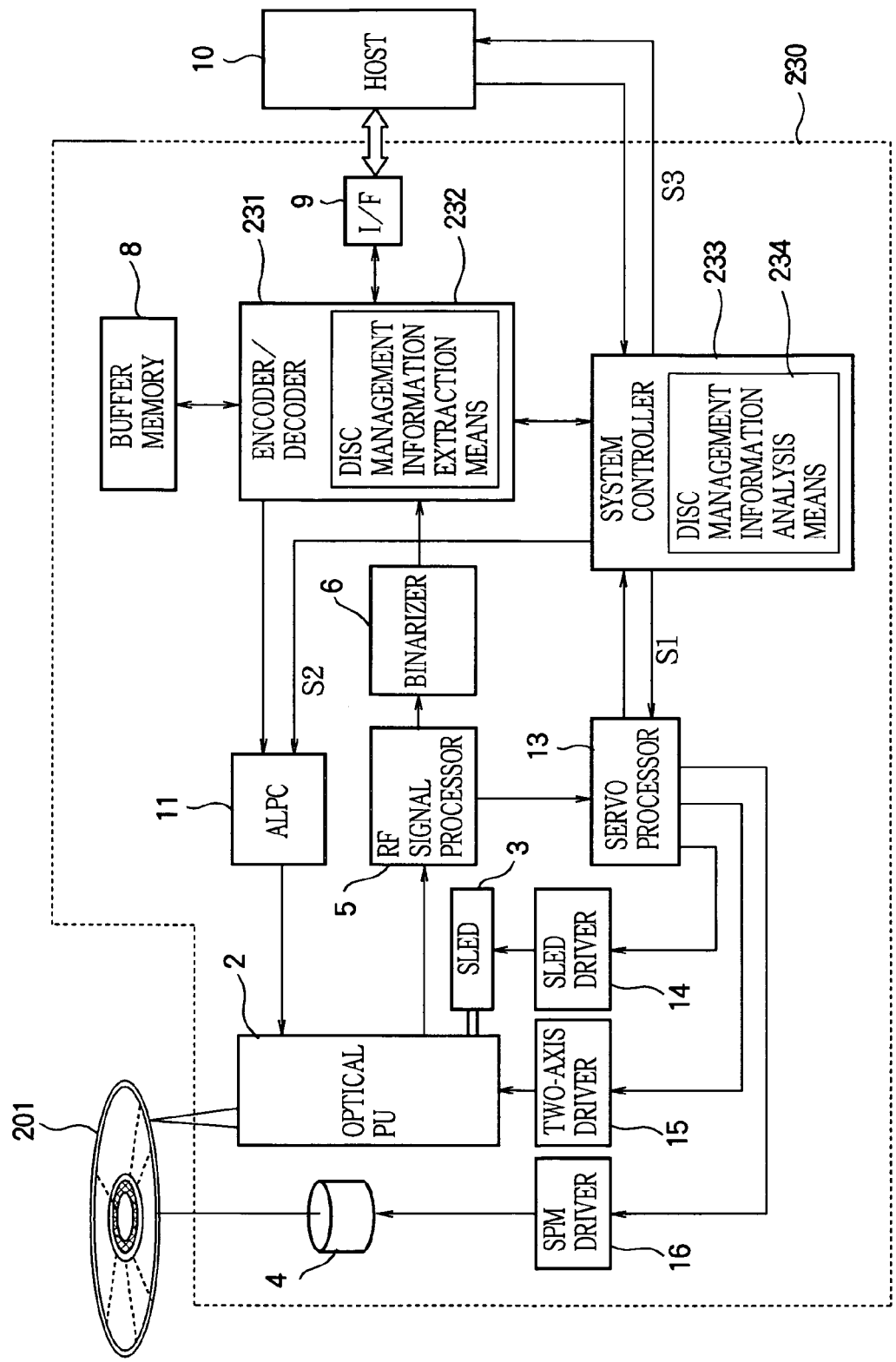
FIG. 16 is a block diagram of an optical disc driving device in a thirteenth embodiment.

FIG. 16 is a block diagram of an optical disc driving apparatus 230 that can play the optical disc 201 in the twelfth embodiment. Operations of components with the same reference numerals as in FIG. 2 in the second embodiment are similar to the operations in the second embodiment, so descriptions will be omitted.

As characterizing operations, initial operations performed in the optical disc driving apparatus 230 will be described below.

First, when the optical disc 201 is inserted into the optical disc driving apparatus 230 and power is turned on, the optical disc driving apparatus 230 accesses the optical disc 201 sequentially from its inner circumference; when the access reaches a prescribed address in the lead-in area 221, the encoder/decoder 231 starts buffering data in the buffer memory 8, and error correction and de-interleaving of reproduced information are carried out.

After error correction, from the information that has been correctly reproduced from the lead-in area 221, a disc management information extraction means 232 in the encoder/decoder 231 extracts the disc management information 224 and outputs it to the system controller 233. The disc management information 224 is analyzed by a disc management information analysis means 234 in the system controller 233. More specifically, first the system controller 233 detects the reproducing identification information 225 recorded in the disc management information 224.

If the optical disc driving apparatus 230 does not match the detected reproducing identification information 225, more specifically, if the optical disc driving apparatus 230 compares reproducing identification information stored in the system controller 233 in the optical disc driving apparatus 230 with the reproducing identification information 225 extracted form the optical disc 201 and finds that the reproducing identification information 225 extracted from the optical disc 201 has been changed to a new number, or if the optical disc driving apparatus 230 itself does not store reproducing identification information, it means that reproducing compatibility is not assured because the reproducing conditions for the optical disc 201 have been altered, or for some other reason, so a servo control signal S1 inhibiting access (seek) operations to the user data area 222 outward of the lead-in area 221 is supplied to the servo processor 13. Travel of the optical head into the user data area 222 is thereby inhibited, and a state of still (stationary) reproducing in the lead-in area 221 is entered.

Access (seek) operations can be inhibited by halt processing as in 1) and 2) below, as described in the second embodiment.

1) The two-axis driver 15 turns off focusing in the optical pickup 2, responsive to the focus control signal from the servo processor 13.

2) The automatic laser power controller (ALPC) 11 turns off the reproducing laser power in response to the laser control signal S2 from the system controller 233, halting emission of light.

As a result of analysis of the disc management information 224, the system controller 233 outputs an access inhibition interrupt signal S3 to the host 10, indicating an optical disc in which access to the user data area 222 is inhibited. This enables the host 10 to recognize that reproducing compatibility of the optical disc 201 loaded into the optical disc driving apparatus 230 is not assured.

As a result of analysis of the disc management information 224, if access (seek) operations to the user data area 222 are possible, a read command is issued from the host 10 and information is reproduced.

As in previous embodiments, the access operation identification information in this embodiment is not necessarily just reproducing identification information 225 but may also be recording identification information. In this case, the system controller 233 in the optical disc driving apparatus 230 compares its own access operation identification information (reproducing identification information, recording identification information) with the access operation identification information extracted from the optical disc 201 before performing subsequent operations.

According to this embodiment, when reproducing compatibility or recording compatibility cannot be assured because of a new version or for some other reason, access operations by the optical head to the user data area 222 can be inhibited, thereby protecting the content of the optical disc during reproducing or recording, and accordingly avoiding worst-case scenarios such as damage to the optical disc.

Fourteenth Embodiment

Figure 17:
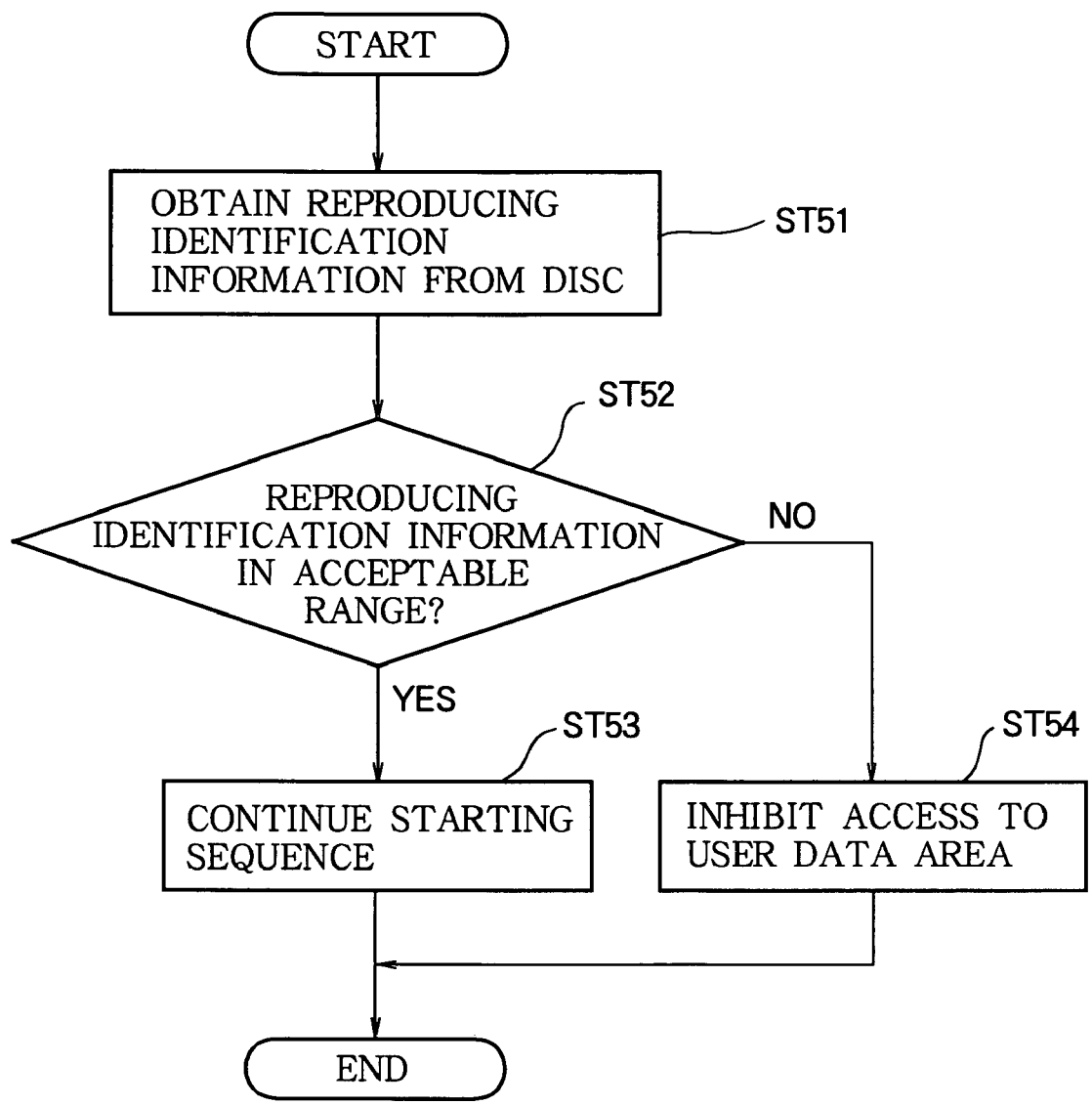
FIG. 17 is a flowchart illustrating operations in a fourteenth embodiment when the optical disc is loaded into an optical disc driving apparatus.

Referring to FIG. 17, the flow of operations when the optical disc 201 in the twelfth embodiment is loaded into the optical disc driving apparatus 230 will be described.

When the optical disc 201 is loaded into the optical disc driving apparatus 230, the optical disc driving apparatus 230 executes a starting operation sequence in which, without relying on commands from the host 10, it automatically carries out various adjustments while obtaining various information from the optical disc 201. In the starting operation sequence, the disc management information extraction means 232 in the optical disc driving apparatus 230 obtains the disc management information 224 from the optical disc 201 and extracts the reproducing identification information 225 (ST51) and the disc management information analysis means 234 compares the extracted reproducing identification information 225 with the reproducing identification information acceptable to the optical disc driving apparatus (ST52). If the reproducing identification information 225 extracted from the optical disc 201 is reproducing identification information acceptable to the optical disc driving apparatus 230, the optical disc driving apparatus 230 continues the starting operation sequence (ST53). If the reproducing identification information 225 extracted from the optical disc 201 is not reproducing identification information acceptable to the optical disc driving apparatus 230, the optical disc driving apparatus 230 inhibits access to the user data area (ST54).

Figure 18:
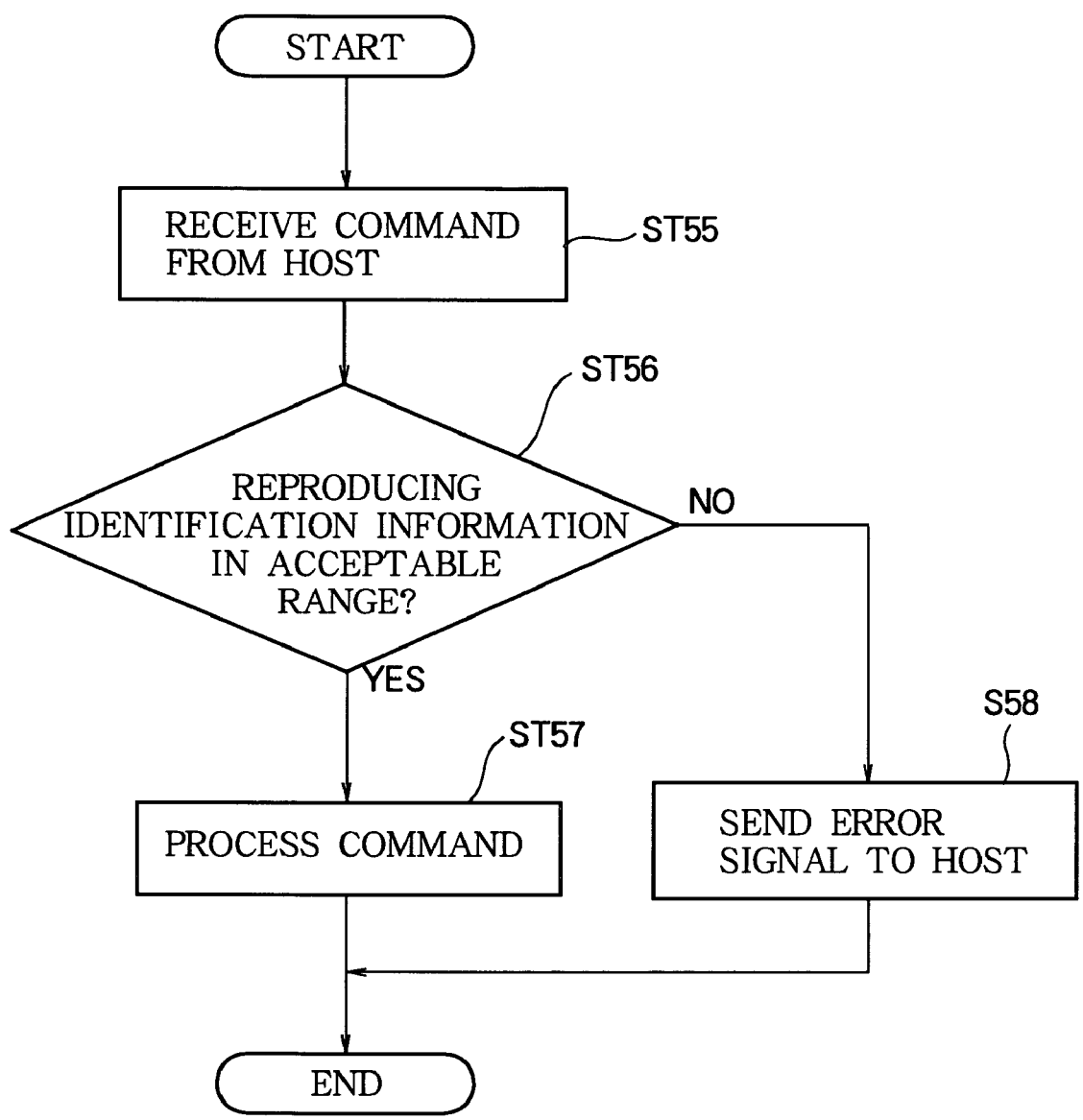
FIG. 18 is a flowchart illustrating operations in a fourteenth embodiment when the optical disc driving apparatus receives a command from its host.

Continuing, after the optical disc driving apparatus 230 has performed the sequence of starting operations in FIG. 17 and is in the standby state, when it receives a command from the host 10, it operates as shown in FIG. 18. When the optical disc driving apparatus 230 has completed the starting operations and is waiting for a command from the host 10, if it receives a command from the host 10 (ST55), it decides (ST56) whether or not the command matches the reproducing identification information acceptable to the optical disc driving apparatus 230 as determined in step ST52 in the starting sequence; if it does not, the optical disc driving apparatus 230 outputs an error signal to the host 10 (ST58) and immediately enters the command waiting state. If the command matches the reproducing identification information acceptable to the optical disc driving apparatus 230 as determined in the starting sequence, it executes the command (ST57), then stands by and waits for another command.

As in previous embodiments, the access operation identification information in this embodiment is not necessarily just reproducing identification information 225 but may also be recording identification information.

According to this embodiment, even when, because of a new version or for some other reason, the optical disc 201 includes information that cannot be read by an optical disc driving apparatus, or reproducing or recording cannot be carried out under the reproducing conditions or recording conditions of the optical disc driving apparatus, if the extracted access operation identification information as described above is information not acceptable to the optical disc driving apparatus, access operations by the optical head to the user data area 222 can be inhibited, thereby protecting the content of the optical disc during reproducing or recording, and accordingly avoiding worst-case scenarios such as damage to the optical disc.

Fifteenth Embodiment

Figure 19:
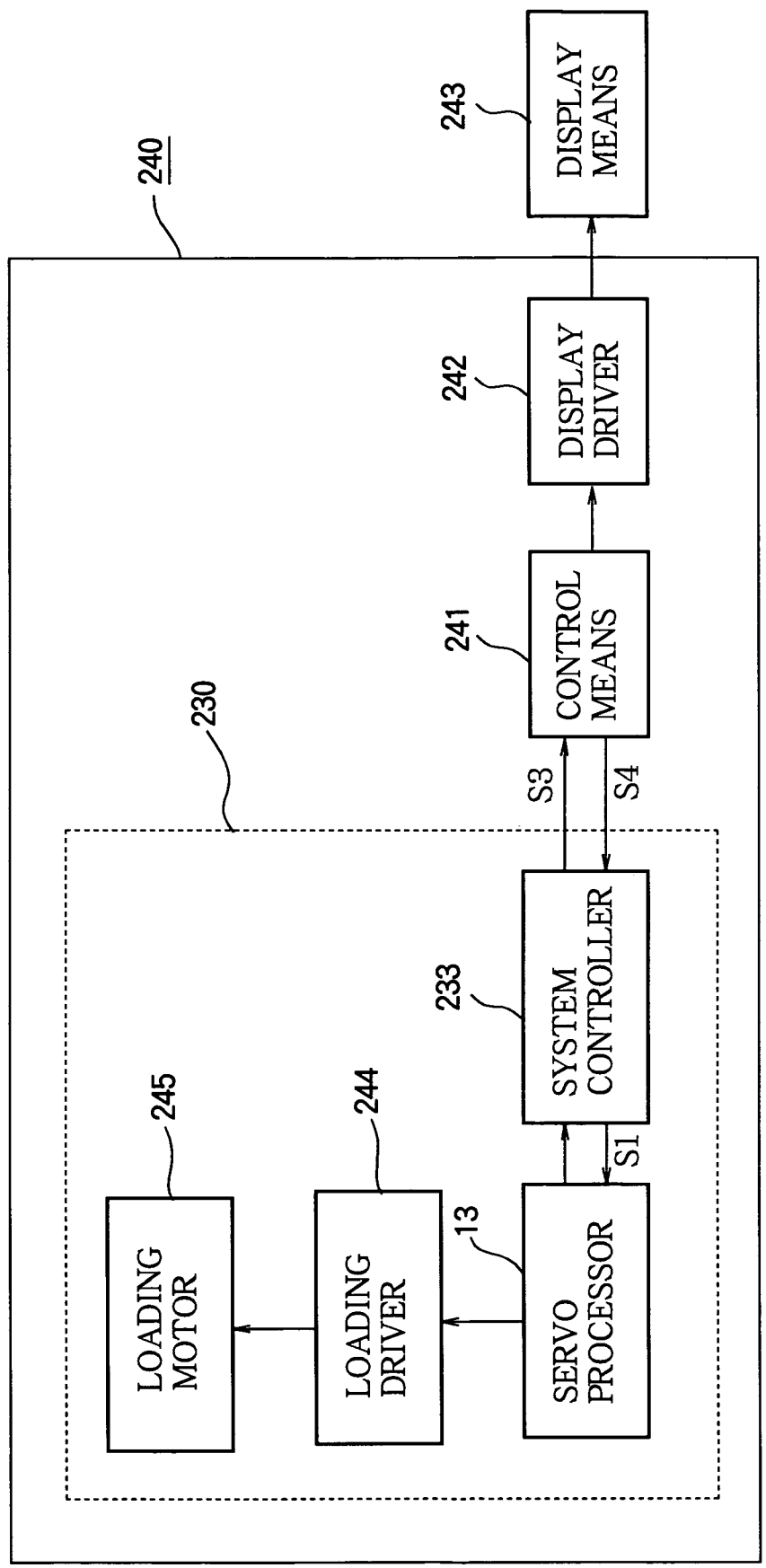
FIG. 19 is a block diagram of a data processing apparatus having an optical disc driving apparatus in a fifteenth embodiment.

In this embodiment, a case in which an optical disc driving apparatus is connected to a data processing apparatus such as a personal computer will be described with reference to FIG. 19. FIG. 19 shows a simplified view of the structure of the optical disc driving apparatus 230.

Referring to FIG. 19, the optical disc driving apparatus 230 is embedded in a data processing apparatus 240 and connected to a control means 241 in the data processing apparatus 240. The control means 241 controls not only the optical disc driving apparatus 230 but also the data processing apparatus 240 as a whole. The host 10 described in the preceding embodiments corresponds to the control means 241 of the data processing apparatus 240.

The signal S3 sent from the system controller 233 in the optical disc driving apparatus 230 to the control means 241 in the data processing apparatus 240 may be any of the following:

(1) the access inhibition interrupt signal described in the thirteenth embodiment, which indicates that the optical disc 201 is an optical disc in which access to the user data area 222 is inhibited;

(2) status information indicating that the optical disc driving apparatus 230 is not actually accessing the user data area 222; or (3) information including both the reproducing identification information stored in the optical disc driving apparatus 230 and the reproducing identification information 225 extracted from the optical disc 201.

When the two items of reproducing identification information described in (3) above are sent from the system controller 233 in the optical disc driving apparatus 230, the control means 241 in the data processing apparatus 240 first receives both items of reproducing identification information and analyzes them. If the result of the analysis shows that the reproducing identification information 225 of the optical disc 201 is not acceptable to the optical disc driving apparatus 230, a predetermined abort operation as shown in (4) and/or (5) below is performed according to the interrupt signal or status information.

(4) The control means 241 of the data processing apparatus 240 sends the system controller 233 in the optical disc driving apparatus 230 a command S4 for opening the disc tray to eject the optical disc 201 from the optical disc driving apparatus 230. The system controller 233 in the optical disc driving apparatus 230 receives the command S4 and sends it to the servo processor 13; the servo processor 13 generates a loading control signal and supplies it to a loading driver 244; the loading driver 244 drives a loading motor 245 responsive to the loading control signal, whereby the optical disc 201 is automatically ejected.

(5) The control means 241 of the data processing apparatus 240 drives a display driver 242 to display a message on a display means 243 indicating that the optical disc driving apparatus 230 cannot play the optical disc 201. The message displayed by the display means 243 may state that the disc cannot be accessed because of a reproducing incompatibility.

The command S4 may also be a command that enables the control means 241 of the data processing apparatus 240 to check the factor that caused the optical disc driving apparatus 230 to halt the access operation. In the above description, the signal S3 is sent automatically from the optical disc driving apparatus 230, but if the control means 241 sends the optical disc driving apparatus 230 a command S4 that requests checking of the factor that caused the optical disc driving apparatus 230 to halt the access operation, the optical disc driving apparatus 230 may also send the control means 241 a response in one of the forms (1), (2), or (3) described above.

Figure 20:
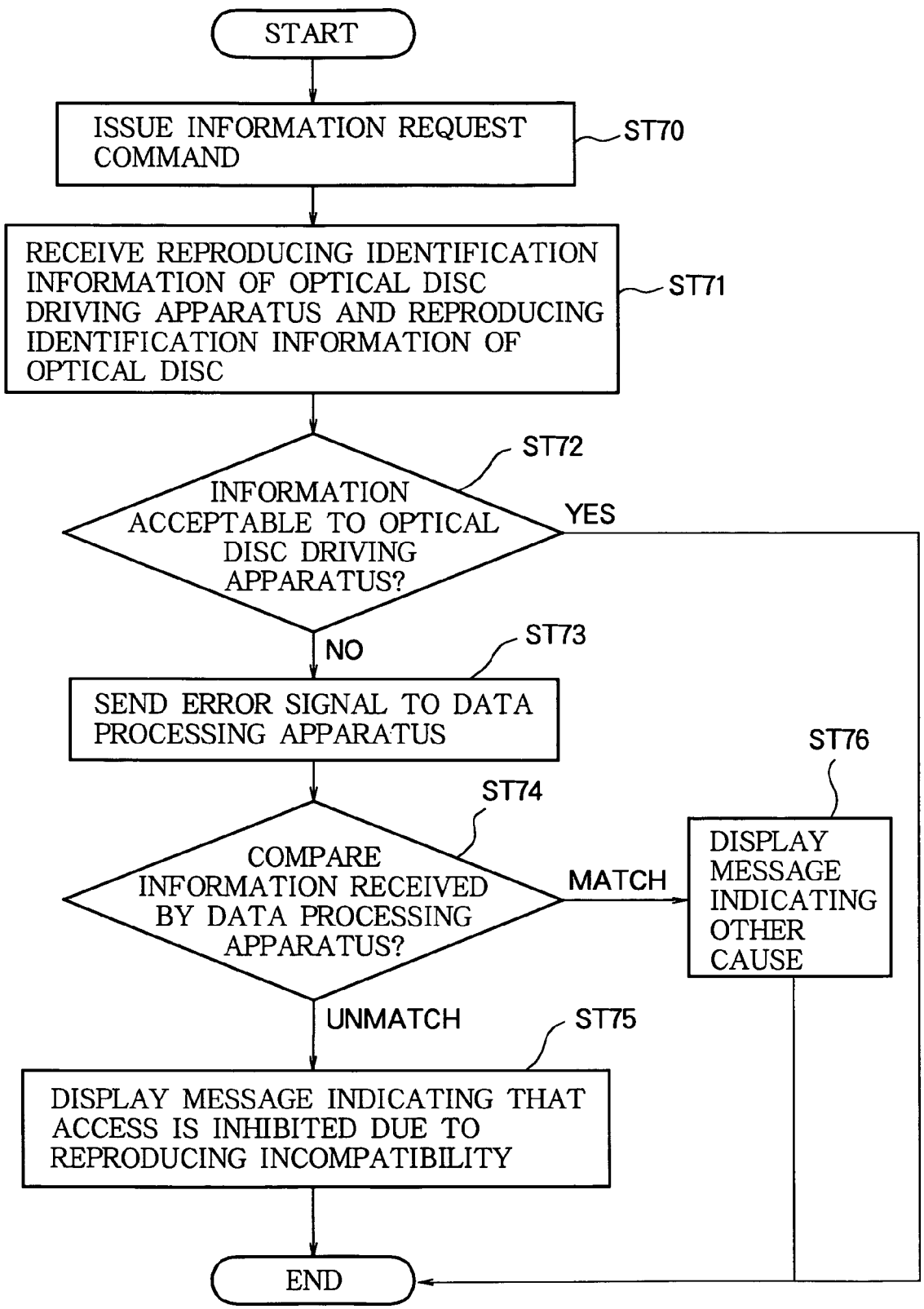
FIG. 20 is a flowchart illustrating operations in the fifteenth embodiment when the data processing apparatus issues a command to the optical disc driving apparatus.

FIG. 20 shows the flow of operations when the control means 241 in the data processing apparatus 240 issues a command to the optical disc driving apparatus 230. More specifically, a case in which the command S4 described above is issued from the control means 241 and a response of type (3) above is sent from the optical disc driving apparatus 230 to the control means 241 will be described.

Referring to FIG. 20, the control means 241 in the data processing apparatus 240 issues the command S4 that requests reproducing identification information from the optical disc driving apparatus 230 (ST70). Responding to this command S4, the optical disc driving apparatus 230 sends the control means 241 in the data processing apparatus 240 two items of reproducing identification information, reproducing identification information possessed by the optical disc driving apparatus 230 and the reproducing identification information 225 extracted from the optical disc 201, and the control means 241 receives both items of reproducing identification information (ST71).

The optical disc driving apparatus 230 determines whether the reproducing identification information 225 extracted from the optical disc 201 is acceptable information (ST72). If it is acceptable (YES), the optical disc driving apparatus 230 ends the operation and waits for the next command (e.g., a command to start reproducing input by a user). If the information is not acceptable, the optical disc driving apparatus 230 sends the control means 241 in the data processing apparatus 240 an error signal S3 (ST73). The error signal may indicate an incompatible disc or a disc having an unknown format. The control means 241 in the data processing apparatus 240 then compares the two items of reproducing identification information that were obtained in step ST71 (ST74); if they do not match (unmatch), then as the cause of the error signal was disagreement between the reproducing identification information in the optical disc driving apparatus 230 and the optical disc 201, the control means 241 commands the display means 243 to display a message indicating that the disc is inaccessible because of reproducing incompatibility (ST75). If they match (match), the error signal was sent for another reason, and the control means 241 commands the display means 243 to display an error message indicating that another reason is the cause (ST76).

In FIG. 20, steps ST70 and ST71 may be carried out after the optical disc driving apparatus 230 issues an error signal S3, that is, between steps ST73 and ST74.

In case (3) above, differing from cases (1) and (2), it is not necessary to define a separate error signal indicating a special error signal; an ordinary existing error status signal may be used, which easily provides compatibility with existing personal computers.

In this embodiment, the optical disc driving apparatus 230 is embedded in a data processing apparatus 240, but the optical disc driving apparatus 230 may be embedded in an optical disk recording/reproducing apparatus for recording or reproducing images and/or sounds form an optical disc. Even such an optical disc recording/reproducing apparatus, if it has a structure similar to that of the data processing apparatus 240 above, can carry out the predetermined abort operation described in (4) and/or (5) above.

As in previous embodiments, the access operation identification information in this embodiment is not necessarily just reproducing identification information 225 but may also be recording identification information.

According to this embodiment, when an optical disc driving apparatus is actually built into a data processing apparatus or an optical disc recording/reproducing apparatus, a predetermined abort operation can be carried out for an optical disc for which reproducing compatibility or recording compatibility is not guaranteed, thereby informing the user of the cause as well as protecting the content of the optical disc during reproducing or recording, and avoiding worst-case scenarios such as damage to the optical disc.

Sixteenth Embodiment

In this embodiment, a method of using the optical disc 201 shown in the twelfth embodiment to carry out an operational test will be described with reference to FIG. 21; this operational test is usually carried out before shipment of an optical disc driving apparatus product.

Two types of optical discs 201(a) and 201(b) are used in this operational test method. Reproducing identification information indicating that the optical disc driving apparatus 230 cannot reproduce the information recorded in the user data area 222 of the optical disc 201(a) is recorded in the first optical disc 201 (a). Reproducing identification information indicating that the optical disc driving apparatus 230 can reproduce the information in the user data area 222 of the optical disc 201(b) is recorded in the second optical disc 201(b). Except for the reproducing identification information, the information in the first optical disc 201(a) is identical to the information in the second optical disc 201(b).

As shown in FIG. 21, the first optical disc 201(a) is inserted into the optical disc deriving apparatus under test (ST60). The disc management information extracting means of the optical disc driving apparatus under test extracts reproducing identification information from the first optical disc 201(a) (ST61), and the disc management information analyzing means compares the extracted reproducing identification information with the reproducing identification information acceptable to the optical disc driving apparatus (ST62). The reproducing identification information extracted from the first optical disc 201(a) is reproducing identification information unacceptable to the optical disc driving apparatus, so access to the user data area of the optical disc driving apparatus is inhibited (ST63). In this case, the abort processing described in the fifteenth embodiment is carried out: for example, the optical disc is ejected (as described in (4) in the fifteenth embodiment), or a message indicating that the optical disc driving apparatus 230 cannot reproduce the optical disc is displayed (as described in (5) in the fifteenth embodiment). If not automatically ejected, the first optical disc 201(a) is ejected manually (ST64).

Next, the second optical disc 201(b) is inserted in the optical disc driving apparatus under test (ST65). The disc management information extracting means of the optical disc driving apparatus under test extracts reproducing identification information from the second optical disc 201(b) (ST66), and the disc management information analyzing means compares the extracted reproducing identification information with the reproducing identification information acceptable to the optical disc driving apparatus (ST67). The reproducing identification information extracted from the second optical disc 201(b) is reproducing identification information acceptable to the optical disc driving apparatus, so access to the user data area of the optical disc driving apparatus is carried out (ST68). In this case, a message indicating that access to the user data area was carried out, or images and/or sound data stored in the user data area, are displayed by the display means 243 shown in FIG. 19. Then the second optical disc 201(b) is ejected (ST69).

As described above, the first optical disc 201(a) can be used to check that access is inhibited and the second optical disc 201(b) can be used to check that access is not inhibited, assuring that the optical disc driving apparatus will operate normally.

If access operations are not inhibited when the first optical disc 201(a) is inserted (ST62), or access operations are inhibited when the second optical disc 201(b) is inserted (ST67), it can be recognized that the optical disc driving apparatus is operating abnormally, and the operation test is terminated forthwith.

In the flowchart shown in FIG. 21, the order of the tests with the first optical disc 201(a) and the second optical disc 201(b) may be exchanged.

In this embodiment, the first optical disc 201(a) and the second optical disc 201(b) have identical information except for their reproducing identification information, but it is only necessary for the information recorded in the user data area 222 to be identical. If at least the information recorded in the user data area 222 is made identical, a reproducible disc and a non-reproducible disc can be easily distinguished, making it easy to carry out the operational test of the optical disc driving apparatus.

The above description was based on the optical disc 201 in the twelfth embodiment, but the optical discs in the other embodiments may be used similarly.

The reproducing identification information 225 may be replaced with recording identification information.

According to this embodiment, optical discs holding access operation identification information, such as reproducing identification information or recording identification information, can be used in operational tests to recognize easily whether or not the optical disc driving apparatus will operate normally. In particular, if the method used for the abort processing described above is standardized among optical disc driving apparatus manufacturers, it becomes easier to test whether access to optical discs without reproducing compatibility or recording compatibility is reliably inhibited.

INDUSTRIAL APPLICABILITY

This invention can provide an optical disc, an optical disc driving apparatus, an optical disc driving method, a data processing apparatus connected to the optical disc driving apparatus, an optical disc recording/reproducing apparatus incorporating the optical disc driving apparatus, operational testing optical discs, and an operational test method that make it possible to carry out optimal management and prevent the optical disc driving apparatus from damaging itself or the optical disc.

What is claimed is:

1. A method of producing an optical disc having a first data region for storing user data and a second data region containing operation management information, said method comprising:
   determining whether said first data region of the optical disc should not be accessed by a playback device complying with a preceding version of a specification which defines a characteristic of said optical disc, said determining being based on changes in laser power needed to reproduce said first data region;

based on results of said determining step, incrementing reproducing identification information indicating whether the first data region should be accessed by the playback device complying with the preceding version of the specification, and recording said incremented reproducing identification information in the second data region of said optical disc, the second data region containing version information specifying a version of the specification, wherein the second data region is read by the playback device before accessing said first data region, and the incremented reproducing identification information prohibits the playback device complying with the preceding version of the specification from accessing the first data region to prevent possible damage to the disc due to reproducing laser power of said playback device.

2. A method of producing an optical disc according to claim 1, wherein the reproducing identification information is incremented based on an allowable value of the laser power of the optical disc being changed to an extent that the optical disc cannot be reproduced by the playback device complying with the preceding version of the specification.

* * * * *